United States Patent
Oh et al.

(10) Patent No.: US 9,658,493 B2
(45) Date of Patent: May 23, 2017

(54) LIQUID CRYSTAL DISPLAY

(71) Applicant: Samsung Display Co. Ltd., Yongin (KR)

(72) Inventors: Ik Han Oh, Cheonan-si (KR); Se Hyun Lee, Seoul (KR); Wan Namgung, Asan-si (KR); Ho Jun Lee, Asan-si (KR); Youn Hak Jeong, Cheonan-si (KR); Ki Pyo Hong, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 14/959,763

(22) Filed: Dec. 4, 2015

(65) Prior Publication Data

US 2016/0377922 A1    Dec. 29, 2016

(30) Foreign Application Priority Data

Jun. 24, 2015   (KR) ........................ 10-2015-0089546

(51) Int. Cl.
  *G02F 1/1343*  (2006.01)
  *G02F 1/1337*  (2006.01)
  *G02F 1/1335*  (2006.01)

(52) U.S. Cl.
  CPC .. *G02F 1/133707* (2013.01); *G02F 1/133528* (2013.01); *G02F 1/134309* (2013.01); *G02F 2001/133742* (2013.01); *G02F 2001/134345* (2013.01)

(58) Field of Classification Search
  CPC ......... G02F 1/133707; G02F 1/133528; G02F 1/134309

USPC ......................................................... 349/141
See application file for complete search history.

(56) References Cited

U.S. PATENT DOCUMENTS

| 6,829,028 | B2 | 12/2004 | Lai et al. |
| 2009/0279010 | A1* | 11/2009 | Kim ................. G02F 1/133753 349/46 |
| 2012/0262654 | A1* | 10/2012 | Moriwaki ......... G02F 1/133512 349/106 |

FOREIGN PATENT DOCUMENTS

| KR | 1020140113035 | 9/2014 |
| KR | 1020140140801 | 12/2014 |
| KR | 1020150019131 | 2/2015 |

\* cited by examiner

*Primary Examiner* — Lucy Chien
(74) *Attorney, Agent, or Firm* — Cantor Colburn LLP

(57) ABSTRACT

A liquid crystal display includes a first substrate, a first electrode which is disposed on the first substrate, and which includes a stem part for dividing a pixel into a plurality of domains, a plurality of micro branch parts extending in one direction from at least one stem of the stem part, and a peripheral bundle electrode connected to an end of at least one of the micro branch parts and disposed along an edge of the pixel, a first panel including protrusions arranged along an outer circumference of the peripheral bundle electrode and projected in the direction vertical to the first substrate, a second substrate, a second panel including a second electrode which is disposed on the second substrate and which faces the first electrode, and a liquid crystal layer which is interposed between the first panel and the second panel and which includes liquid crystals.

20 Claims, 13 Drawing Sheets

LIQUID CRYSTAL DISPLAY

This application claims priority to Korean Patent Application No. 10-2015-0089546 filed on Jun. 24, 2015, and all the benefits accruing therefrom under 35 U.S.C. §119, the content of which in its entirety is incorporated herein by reference.

BACKGROUND

1. Field

The exemplary embodiments relate to a liquid crystal display.

2. Description of the Related Art

Liquid crystal displays ("LCDs") are one of currently most widely used flat panel display devices, and include two display panels on which electric field generating electrodes such as a pixel electrode and a common electrode are formed, and a liquid crystal layer interposed between the two panels. LCDs apply voltages to the electric field generating electrodes to generate an electric field in the liquid crystal layer, to thus determine the orientation directions of liquid crystal molecules in the liquid crystal layer and control the polarization of incident light, thereby displaying desired images.

Among LCDs, a vertically aligned mode LCD in which the major axes of the liquid crystal molecules are aligned vertical to upper and lower display panels in the absence of electric field is gaining in popularity due to its merits of high contrast ratio and wide viewing angle.

To implement a wide viewing angle in the vertically aligned mode LCD, a plurality of domains having different orientation directions of liquid crystals may be formed in one pixel.

As an example of means for forming a plurality of domains, a cutout such as a slit may be formed in the electric field generating electrodes. This method of forming a slit enables liquid crystals to be realigned by a fringe field formed between an edge of the cutout and the electric field generating electrodes facing the edge, thereby forming a plurality of domains.

Ensuring wide viewing angle is a significant issue in a vertically aligned mode LCD and to this end, a cutout such as a micro slit may be formed in the electric field generating electrodes or protrusions are provided on the electric field generating electrodes. Since the cutout or protrusions may determine the tilt direction of the liquid crystal molecules, the cutout or protrusions may be arranged appropriately to distribute the tilt direction of the liquid crystal molecules into various directions, thereby achieving wide viewing angle.

The vertically aligned mode LCD may have side visibility lower than front visibility thereof. To solve this problem, a technique has been developed in that one pixel electrode is divided into two subpixel electrodes, and a high voltage and a low voltage are applied respectively to the subpixel electrodes to make the orientation directions of the liquid crystal molecules of the two subpixel electrodes different from each other, thereby improving visibility in left and right viewing angle directions.

SUMMARY

An exemplary embodiment of the invention provides a liquid crystal display ("LCD") with improved transmittance. However, exemplary embodiments of the invention are not restricted to the one set forth herein. The other exemplary embodiments of the invention which are not mentioned herein will become more apparent to one of ordinary skilled in the art to which the invention pertains by referencing the detailed description of the invention given below.

According to an exemplary embodiment of the invention, an LCD including a first substrate, a first electrode which is disposed on the first substrate, and which includes a stem part for dividing a pixel into a plurality of domains, a plurality of micro branch parts extending in one direction from at least one stem of the stem part, and a peripheral bundle electrode connected to an end of at least one of the micro branch parts and disposed along an edge of the pixel, a first panel including protrusions arranged along an outer circumference of the peripheral bundle electrode and projected in the direction vertical to the first substrate, a second substrate, a second panel including a second electrode which is disposed on the second substrate and which faces the first electrode, and a liquid crystal layer which is interposed between the first panel and the second panel and which includes liquid crystals.

In an exemplary embodiment, the first panel may include a first slit pattern one end of which contacts the stem part and the other end of which contacts the peripheral bundle electrode, and a second slit pattern which spaces a part of branched finger electrodes of the micro branch parts, and one end of which disposed along a lengthwise direction of the branched finger electrodes contacts the stem part and the other end of which contacts the protrusions, wherein the first and second slit patterns remove branched finger electrodes neighboring the branched finger electrodes of the micro branch parts so as to space the branched finger electrodes apart from each other, and at least one of the first slit pattern and the second slit pattern is disposed on the first panel.

In an exemplary embodiment, the first slit pattern and the second slit pattern may be spaced apart from each other (in a stepping-stone manner) in the first panel.

In an exemplary embodiment, the branched finger electrodes and the slit patterns may be disposed alternately to one another in adjacent domains.

In an exemplary embodiment, the branched finger electrodes and the slit pattern may have pitches ranging from about 4 µm to about 8 µm.

In an exemplary embodiment, the LCD may comprise a first polarization plate having a polarization axis in one direction, the first polarization plate being disposed on the first panel, and a second polarization plate having a polarization axis orthogonal to the one direction, the second polarization plate being disposed on the second panel, wherein the micro branch parts extend in a direction ranging from about 30 degrees (°) to about 60° with respect to the polarization axes of the first and second polarization plates.

In an exemplary embodiment, the first electrode may include the peripheral bundle electrode which contacts the protrusions and which is disposed in a direction parallel to the protrusions, the stem part including horizontal and vertical stem parts which are connected to the peripheral bundle electrode and which divide the pixel into the plurality of domains, and the micro branch parts extended to the horizontal and vertical stem parts and connected to the peripheral bundle electrode, the peripheral bundle electrode, the stem part and the micro branch parts being integrally provided.

In an exemplary embodiment, widths of the horizontal and vertical stem parts basically range from about 2 micrometers (µm) to about 5 µm.

In an exemplary embodiment, heights of the protrusions range from about 0.5 µm to about 2 µm.

In an exemplary embodiment, widths of the peripheral bundle electrode range from about 2 μm to about 4 μm.

In an exemplary embodiment, widths of the protrusions range from about 3 μm to about 5 μm.

In an exemplary embodiment, the first electrode disposed in the pixel may include a first region in which the micro branch part adjacent to the stem part is disposed, and a second region which is spaced apart from the stem part, and in which at least one peripheral bundle electrode and protrusion are disposed at an end of one of the micro branch parts, wherein the peripheral bundle electrode and protrusion disposed in the second region provide a vector to the liquid crystal molecules in the second region so as to rotate the liquid crystal molecules in a direction similar to an average liquid crystal azimuthal angle of the liquid crystal molecules in the first region.

In an exemplary embodiment, an extending direction of branched finger electrodes and the average liquid crystal azimuthal angle of the liquid crystal molecules may be in the same direction.

In an exemplary embodiment, the first electrode includes a plurality of sub-electrodes may dispose in one pixel, and a connection electrode interconnecting sub-electrodes adjacent to each other.

In an exemplary embodiment, the connection electrode may be disposed in a gap part which spaces sub-electrodes neighboring each other.

In an exemplary embodiment, the protrusions may be disposed in the gap part.

In an exemplary embodiment, the connection electrode may be disposed below the protrusions.

In an exemplary embodiment, the protrusions may be disposed at ends of the horizontal and vertical stem parts and in a corner region of the pixel.

In an exemplary embodiment, the protrusions may be disposed in an edge region of the pixel excluding the corner region of the pixel.

In an exemplary embodiment, the gap part may include horizontal and vertical gap parts which space the sub-electrodes apart from each other, and a rim gap part disposed in an edge of the pixel, wherein widths of the protrusions disposed in the horizontal and vertical gap parts and widths of the protrusions disposed in the rim gap part are different from each other.

According to exemplary embodiments of the invention, there is provided an LCD in which a slit pattern for determining the shape of electrodes and spacing electrodes apart from each other is defined in a pixel, thereby improving visibility and transmittance.

However, effects of exemplary embodiments of the invention are not restricted to the exemplary embodiments set forth herein and more diverse effects are included in this description.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Figure 1:
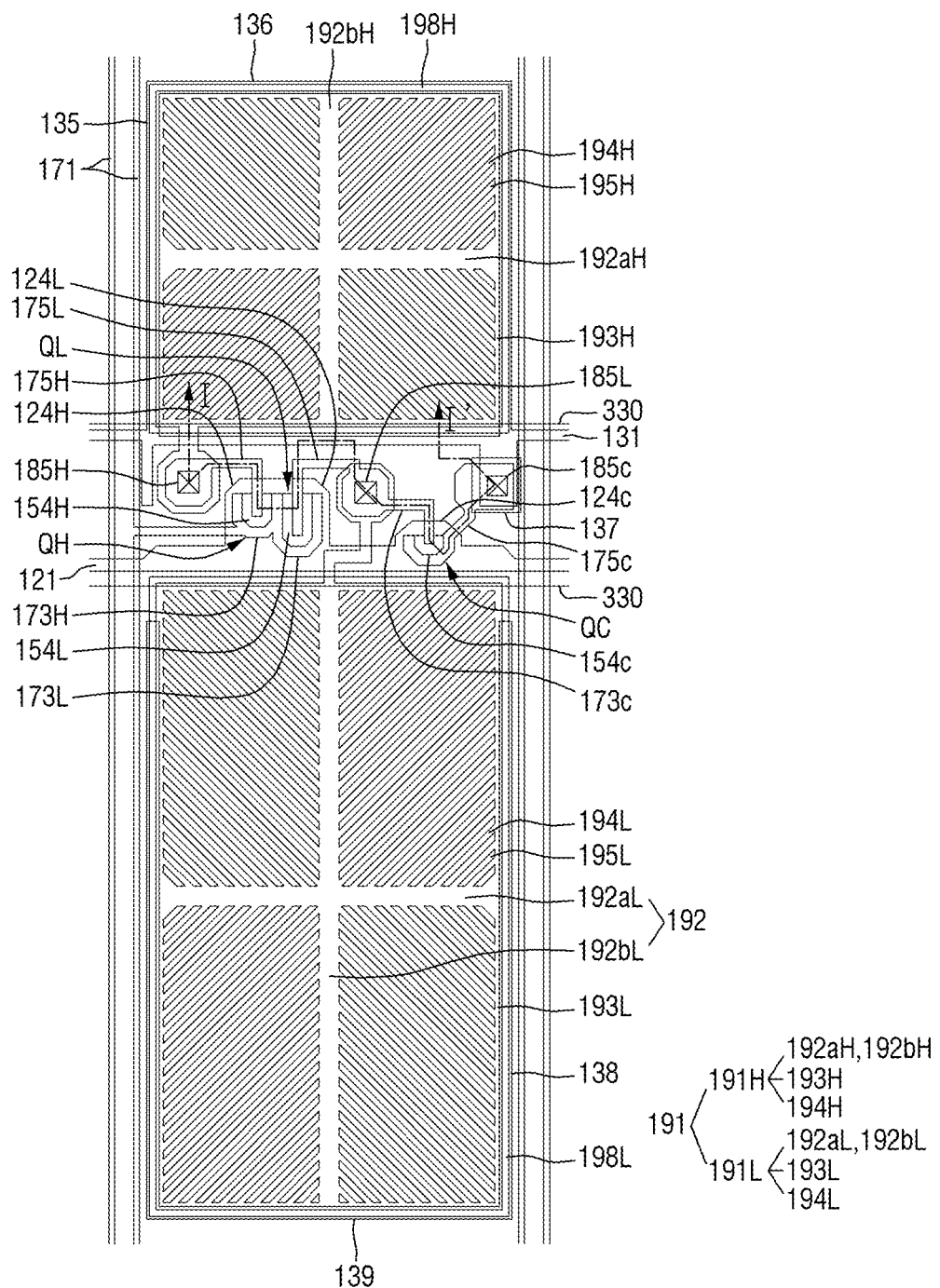
FIG. 1 is a top view of an exemplary embodiment of a liquid crystal display ("LCD") according to the invention.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments of the invention will now be explained with reference to the drawings.

Figure 2:
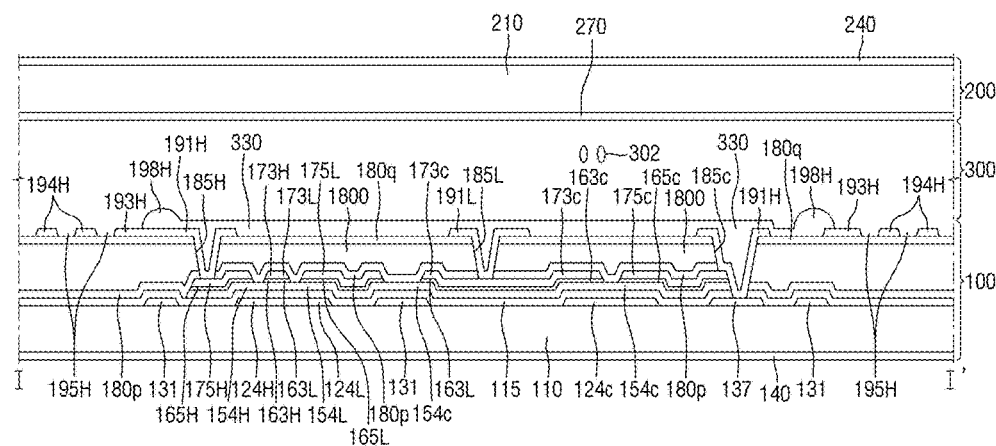
FIG. 2 is a cross-sectional view taken along line I-I' of the LCD of FIG. 1.
Figure 3:
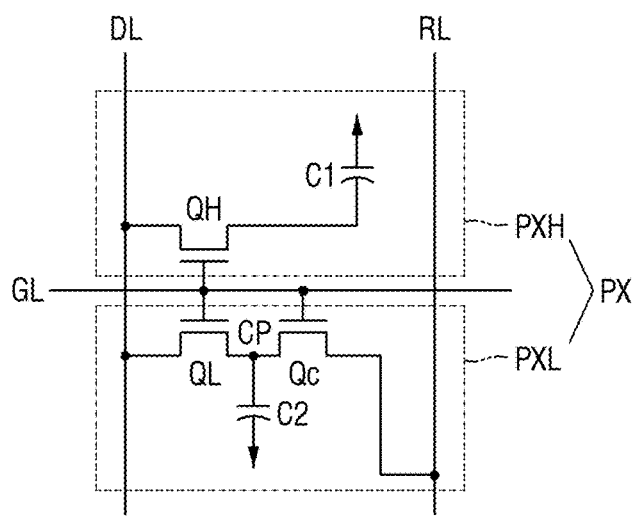
FIG. 3 is a circuit diagram of an equivalent circuit of an exemplary embodiment of one pixel of the LCD according to the invention.
Figure 4:
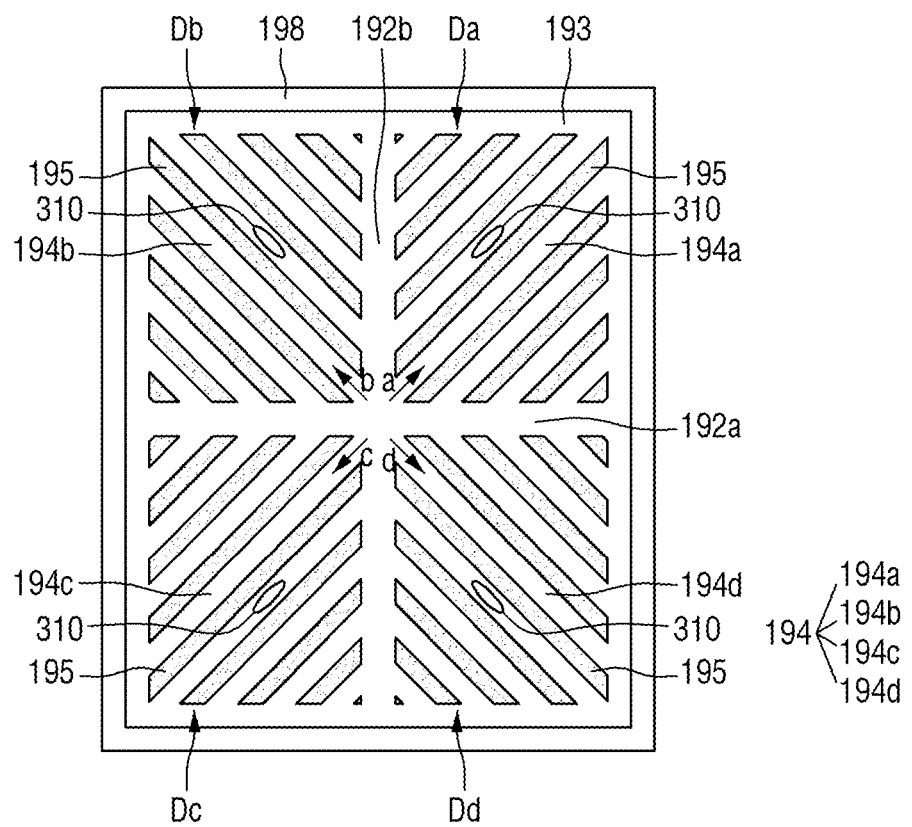
FIG. 4 is a top view illustrating an exemplary embodiment of the expanded one pixel according to the invention.

FIG. 1 is a top view of a liquid crystal display ("LCD") according to an exemplary embodiment of the invention. FIG. 2 is a cross-sectional view taken along line I-I' of the LCD of FIG. 1. FIG. 3 is a circuit diagram of an equivalent circuit of one pixel of the LCD according to an exemplary embodiment of the invention. FIG. 4 is a top view illustrating the expanded one pixel according to an exemplary embodiment of the invention.

For convenience of description, FIGS. 1 and 3 depict one pixel PX and a gate line GL, a data line DL and a voltage dividing reference line RL related to the pixel for convenience of description, however, a plurality of pixels PX may be arranged into a matrix of columns and rows, and the pixels PX may be arranged in the vicinity of intersecting points between a plurality of gate lines 121 extending in a column direction and a plurality of data lines 171 extending in a row direction.

Referring to FIGS. 1 and 2, an LCD includes a first panel 100 and a second panel 200 facing each other, and a liquid crystal layer 300 interposed between the second panel 200 and the first panel 100.

The first panel 100 may include a first substrate 110, a first electrode 191 and a first alignment layer (not shown) provided sequentially on one side of the first substrate 110, and a first polarization plate 140 provided on the other side of the first substrate 110. In an exemplary embodiment, the first electrode 191 provided on the first panel 100 may be, for example, a pixel electrode.

The second panel 200 may include a second substrate 210, a second electrode 270 and a second alignment layer (not shown) provided sequentially on one side of the second substrate 210, and a second polarization plate 240 provided on the other side of the second substrate 210. In an exemplary embodiment, the second electrode 270 provided on the second panel 200 may be, for example, a common electrode.

The first panel 100 or the second panel 200 may further include switching elements QH, QL and Qc, a color filter 1800, a light blocking member 330 and the like, and either the first polarization plate 140 or the second polarization plate 240 may be omitted. Either or both of the first alignment layer and the second alignment layer may be omitted according to circumstances.

The liquid crystal layer 300 may include liquid crystals having negative dielectric anisotropy or positive dielectric anisotropy. An exemplary embodiment in which the liquid crystal layer 300 includes liquid crystals with negative dielectric anisotropy will be described hereinafter. The major axes of liquid crystal molecules 302 of the liquid crystal layer 300 may be aligned substantially vertical to surfaces of alignment layers (or surfaces at which the alignment layers contact) in the absence of electric field between the first and second electrodes 191 and 270. In an alternative exemplary embodiment, the major axes of liquid crystal molecules 302 of the liquid crystal layer 300 may be aligned to have a pretilt angle with respect to the thickness direction of the liquid crystal layer 300.

The first panel 100 and the second panel 200 will now be described separately from each other.

The first panel 100 may include the first substrate 110, the first switching element QH, the second switching element QL, the third switching element Qc, the gate lines 121, a voltage dividing reference line 131, the data lines 171 and the pixel electrodes 191 electrically connected to the switching elements QH, QL and Qc. The pixel electrode 191 may include a first subpixel electrode 191H and a second subpixel electrode 191L. The first subpixel electrode 191H may include a horizontal stem 192aH, a vertical stem 192bH, a peripheral bundle electrode 193H and a micro branch 194H, and the second subpixel electrode 191L may include a horizontal stem 192aL, a vertical stem 192bL, a peripheral bundle electrode 193L and a micro branch 194L. A slit pattern 195H may be defined in the first subpixel electrode 191H and a slit pattern 195L may be defined in the second subpixel electrode 191L.

The voltage dividing reference line 131 may include first sustain electrode lines 135 and 136 and a reference electrode 137. Although the first sustain electrode lines 135 and 136 are depicted as not being connected to the voltage dividing reference line 131 in the drawing, second sustain electrodes 138 and 139 may be overlaid with the second subpixel electrode 191L.

The first substrate 110 of the first panel 100 may include a plurality of gate conductors disposed thereon, the gate conductors including the plurality of gate lines 121, the voltage dividing reference line 131 and a plurality of sustain electrode lines 135, 136, 138 and 139. In an exemplary embodiment, the first substrate 110 may include glass such as soda lime glass or boro silicate glass, plastic and the like.

The gate line 121 and the voltage dividing reference line 131 may be arranged in one direction, for example, in a horizontal direction, and may transmit gate signals. The gate line 121 may include a first gate electrode 124H and a second gate electrode 124L which are partially protruded from the gate lines 121 interposed between the first subpixel electrode 191H and the second subpixel electrode 191L, and the gate line 121 may include a third gate electrode 124c protruded upward. In this case, the first gate electrode 124H and the second gate electrode 124L may be interconnected to form a protrusion.

In other exemplary embodiments, step-down gate lines different from the gate line 121 may be provided.

The voltage dividing reference line 131 may extend in a horizontal direction and transfer a predetermined voltage such as a common voltage. The voltage dividing reference line 131 may include first sustain electrodes 135 and 136, and second sustain electrodes 138 and 139 extending downward.

Specifically, the first vertical sustain electrode 135 among the first sustain electrodes 135 and 136 may be provided along the vertical edge of the first pixel electrode 191H disposed thereon, and the second vertical sustain electrode 138 among the second sustain electrodes 138 and 139 may be provided along the vertical edge of the second pixel electrode 191L. The second horizontal sustain electrode 139 may be interposed between the horizontal edge of the second subpixel electrode 191L and the horizontal edge of the first subpixel electrode 191H, and the first and second horizontal sustain electrodes 136 and 139 may be provided along the vertical edges of the first and second subpixel electrodes 191H and 191L.

Consequently, the first vertical sustain electrode 135 and the first horizontal sustain electrode 136 may be provided along the edge of the first subpixel electrode 191H and overlaid with at least a part of the first subpixel electrode 191H, and the second vertical sustain electrode 138 and the second horizontal sustain electrode 139 may be provided along the edge of the second subpixel electrode 191L and overlaid with at least a part of the second subpixel electrode 191L.

The first horizontal sustain electrode 136 provided above and the second horizontal sustain electrode 139 provided below are depicted as being separated from each other in FIG. 1, however, in reality, the two horizontal sustain electrodes 136 and 139, the first and second horizontal sustain electrodes 136 and 139 enclose respectively the subpixel electrodes 191H and 191L which are electrically connected respectively to the horizontal sustain electrodes 136 and 139 disposed in upper and lower pixels PX adjacent each other so as to form a ring shape belonging to one pixel.

The gate line 121, the voltage dividing reference line 131 and the sustain electrode lines 135, 136, 138 and 139 may include the same material and may be disposed on the same layer. In an exemplary embodiment, the gate line 121, the voltage dividing reference line 131 and the sustain electrode lines 135, 136, 138 and 139 may include aluminum-based metal such as aluminum (Al) and aluminum alloy, silver-based metal such as silver (Ag) and silver alloy, copper-based metal such as copper (Cu) and copper alloy, molybdenum-based metal such as molybdenum (Mo) and molybdenum alloy, chrome (Cr), titanium (Ti), tantalum (Ta) and the like.

In an exemplary embodiment, the gate line 121, the voltage dividing reference line 131 and the sustain electrode lines 135, 136, 138 and 139 may have a multi-layer structure including two conductive layers (not shown) having physical properties different from each other. In an exemplary embodiment, either of the two conductive layers may include low resistivity metal, for example, aluminum(Al)-based metal, silver(Ag)-based metal, copper(Cu)-based metal and the like so as to reduce signal delay or voltage drop.

A gate insulation layer 115 may be disposed on the whole surface of the first substrate 110 on which the gate line 121, the voltage dividing reference line 131 and the sustain electrode lines 135, 136, 138 and 139 are provided. In an exemplary embodiment, the gate insulation layer 115 may include silicon oxide (SiOx), silicon nitride (SiNx) or the like.

Semiconductor layers 154H, 154L and 154c may be disposed on the gate insulation layer 115. At least a part of the semiconductor layers 154H, 154L and 154c may be overlaid with gate electrodes 124H, 124L and 124C. In this case, the semiconductor layers 154H, 154L and 154c may include an oxide semiconductor including amorphous silicon (a-silicon), polycrystalline silicon (poly-silicon), zinc oxide (ZnO) and the like, for example.

A plurality of ohmic contact members 163H, 165H, 163L, 165L, 163c and 165c may be disposed on the semiconductor layers 154H, 154L and 154c. Like the first ohmic contact member 163H disposed on the first semiconductor layer 154H, ohmic contact members 165H, 163L, 165L, 163c and 165c may be disposed in the respective regions.

A data conductor including a plurality of data lines 171 including a first source electrode 173H and a second source electrode 173L, a first drain electrode 175H, a second drain electrode 175L, a third source electrode 173c and a third drain electrode 175c may be disposed on the ohmic contact members 163H, 165H, 163L, 165L, 163c and 165c and the gate insulation layer 115. The data conductor and a semiconductor and the ohmic contact members provided under the data conductor may be simultaneously provided using a single mask. Furthermore, the data line 171 may have a wide end (not shown) for connection to the other layer or an external driving circuit.

A data conductive layer may be disposed on the semiconductor layers 154H, 154L and 154c. The data conductive layer may include the data line 171 extending in a vertical direction such that the data line 171 intersects the gate line 121.

The data line 171 may transfer a data signal, and mainly extend in a vertical direction so as to intersect the gate line 121 and the voltage dividing reference line 131. Each data line 171 may extend toward the first gate electrode 124H and the second gate electrode 124L, and include the first source electrode 173H and the second source electrode 173L connected with each other.

The data conductor may include the first source electrode 173H and the second source electrode 173L connected to the data line 171, the first drain electrode 175H facing the first source electrode 173H with a space therebetween, the second drain electrode 175L facing the second source electrode 173L with a space therebetween, the third source electrode 173c electrically connected to the second drain electrode 175L, and the third drain electrode 175c facing the third source electrode 173c with a space therebetween.

Ends of the first drain electrode 175H and the second drain electrode 175L may be partially enclosed with the respective first source electrode 173H and second source electrode 173L. The wide one end of the second drain electrode 175L may extend to form the third source electrode 173c. The wide end of the third drain electrode 175c may be overlaid with the reference electrode 137 and connected to a third contact hole 185c, and the other end of the third drain electrode 175c having a U-shape may partially enclose the third source electrode 173c.

The semiconductor layers 154H, 154L and 154c may be arranged into a plane having a shape substantially the same as those of the data conductors 171, 175H, 175L and 175c and the ohmic contact members 164H, 164L and 164c under the data conductors, excluding a channel region between the source electrodes 173H, 173L and 173c and the drain electrodes 175H, 175L and 175c. That is, the semiconductor layers 154H, 154L and 154c may have, including the space between the source electrodes 173H, 173L and 173c and the drain electrodes 175H, 175L and 175c, a portion which is exposed, i.e., which is not covered by the data conductors 171, 175H, 175L and 175c.

As mentioned above, the data line 171 may directly contact the semiconductor layers 154H, 154L and 154c so as to form an ohmic contact. In an exemplary embodiment, the data line 171 may be a single layer including a low resistant material so as to cooperate with the semiconductor layers 154H, 154L and 154c to serve as an ohmic contact. In an exemplary embodiment, the data line 171 may include Cu, Al or Ag.

In an exemplary embodiment, to improve characteristics of ohmic contact with the semiconductor layers 154H, 154L and 154c, the data line 171 may have a single layer structure or a multi-layer structure including Ni, Co, Ti, Ag, Cu, Mo, Al, Be, Nb, Au, Fe, Se, Ta or the like. Examples of the multi-layer structure may include a bi-layer structure such as Ta/Al, Ta/Al, Ni/Al, Co/Al, Mo(Mo alloy)/Cu, Mo(Mo alloy)/Cu, Ti(Ti alloy)/Cu, TiN(TiN alloy)/Cu, Ta(Ta alloy)/Cu and TiOx/Cu or a triple layer structure such as Ti/Al/Ti, Ta/Al/Ta, Ti/Al/TiN, Ta/Al/TaN, Ni/Al/Ni and Co/Al/Co.

In an exemplary embodiment, to improve the aperture ratio of a lower substrate on which a thin film transistor ("TFT") is disposed, both the gate line 121 and the data line 171 may include a transparent conductive material such as indium tin oxide ("ITO"), indium zinc oxide ("IZO") or Al doped zinc oxide ("AZO").

As described above, the first, second and third gate electrodes 124H, 124L and 124c, the first, second and third source electrodes 173H, 173L and 173c, and the first, second and third drain electrodes 175H, 175L and 175c may cooperate with the first, second and third semiconductor layers 154H, 154L and 154c so as to form the respective first, second and third TFTs QH, QL and Qc, and channels of the TFTs may be defined in the respective semiconductor layers 154H, 154L and 154c between the source electrodes 173H, 173L and 173c and the drain electrodes 175H, 175L and 175c.

A protective layer 180 may be disposed on the data conductors 171, 175H, 175L and 175c and exposed semiconductor layers 154H, 154L and 154c. In an exemplary embodiment, the protective layer 180 may include an inorganic layer or an organic layer. In an alternative exemplary embodiment, the protective layer 180 may have a bi-layer structure of a lower inorganic layer and an upper organic layer so as to protect the semiconductor layers 154H, 154L and 154c. In an alternative exemplary embodiment, the protective layer 180 may have a tri-layer structure of a lower inorganic layer, an intermediate organic layer disposed on the lower inorganic layer and an upper inorganic layer disposed on the intermediate organic layer. In an exemplary embodiment, the organic layer used in the protective layer 180 may be a color filter.

In an exemplary embodiment, a lower protective layer 180p that includes an inorganic insulating material such as silicon nitride or silicon oxide may be provided on the data conductors 171, 175H, 175L and 175c and exposed semiconductor layers 154H, 154L and 154c, for example.

An organic layer may be used as the lower protective layer 180p. In this case, the color filter 180O may be used as the organic layer. The color filter 180O may be elongated in a vertical direction along the neighboring data line 171, each color filter 180O may display one of three primary colors of red, green and blue and, and the color filters 180O may be overlaid with each other on the data line 171.

An upper protective layer 180q may be provided on the color filter 180O and the lower protective layer 180p exposed by an opening. The upper protective layer 180q may prevent the color filter 180O from being delaminated, and inhibit the liquid crystal layer 300 from being contaminated by an organic material such as a solvent introduced from the color filter 180O, thereby preventing display defects such as image sticking which might occur during driving of a screen. In an exemplary embodiment, the upper protective layer 180q may include an inorganic insulation material such as silicon nitride or silicon oxide, or an organic material.

A first contact hole 185H and a second contact hole 185L for exposing respective ends of the first drain electrode 175H and the second drain electrode 175L may be defined in the lower protective layer 180p, the color filter 180O and the upper protective layer 180q.

A plurality of pixel electrodes 191 may be disposed on the upper protective layer 180q. The pixel electrodes 191 may be connected to the first drain electrode 175H and the second drain electrode 175L through the first contact hole 185H and the second contact hole 185L. In an exemplary embodiment, the pixel electrodes 191 may include a transparent conductor such as ITO or IZO. The pixel electrodes 191 may generate an electric field to the common electrode 270 disposed on the second panel 200 from the voltage delivered through the first drain electrode 175H and the second drain electrode 175L to which data voltages are applied, thereby rotating the liquid crystal molecules 302 of the liquid crystal layer 300 interposed between the first panel 100 and the second panel 200.

The pixel electrodes 191 may receive data voltages applied thereto through the TFTs Q controlled by a gate signal. That is, the first subpixel electrode 191H and the second subpixel electrode 191L disposed as shown in FIG. 1 may be connected to the first drain electrode 175H and the second drain electrode 175L, respectively, through the first contact hole 185H and the second contact hole 185L, and receive data voltages from the first drain electrode 175H and the second drain electrode 175L, respectively.

The pixel electrodes 191 may be disposed in the respective pixels PX defined by the respective gate lines 121 and the data lines 171.

The pixel electrodes 191 may include the first subpixel electrode 191H and the second subpixel electrode 191L separated from each other with the gate line 121 therebetween and disposed respectively in the upper and lower portions of a pixel region such that the first subpixel electrode 191H and the second subpixel electrode 191L may be neighbored with each other in a row direction.

As described above, the first subpixel electrode 191H and the second subpixel electrode 191L may be disposed in one pixel PX, thereby improving viewing angle. The pixel electrodes 191 will be explained in further detail with reference to FIG. 4 later.

The second panel 100 may include the second substrate 210 facing the first substrate 110, and the common electrode 270. The common electrode 270 may be disposed on the second substrate 210 including transparent glass, plastic or the like.

In an exemplary embodiment, the light blocking member 330 and the color filter 180O may be selectively disposed on the second panel 200. A light blocking member, color filters, an overcoat and a second alignment layer may be selectively disposed on the second substrate 210. In the illustrated exemplary embodiment, the color filter 180O and the light blocking member 330 are disposed on the first panel 100.

As described above, the color filter 180O and the light blocking member 330 may be disposed on the first substrate 110, thereby preventing problems of misalignment when used in a curved display or the like, and when the orientation direction is determined with the second alignment layer, problems of disclination lines caused by the misalignment of liquid crystals may be prevented.

In a selective arrangement of a light blocking member, color filters, an overcoat and a second alignment layer on the second substrate 210, color filters having a plurality of colors may be disposed on the second substrate 210, and the light blocking member may be disposed at a boundary between the plurality of color filters. The color filters may serve to filter the color of a specific wavelength, and the light blocking member also be referred to as a black matrix may serve to prevent light leakage and mixing of different colors of the color filters.

Furthermore, an overcoat layer and a second alignment layer may be selectively disposed on the second panel 200. The overcoat layer may be disposed on the whole surface of the second substrate on which the color filter and the light blocking member are provided. The overcoat layer may include an insulating material, and provide a planarized surface. In an exemplary embodiment, the overcoat layer may be omitted.

The common electrode 270 may be provided on the overcoat layer. The second alignment layer may be disposed on the common electrode 270, and the second alignment layer may be a vertical alignment layer. In an exemplary embodiment, the second alignment layer may be omitted. In an exemplary embodiment, the common electrode 270 may be a cylindrical electrode provided on the second substrate.

An operation of LCD will be described with reference to FIG. 3. One pixel PX of the LCD according to the exemplary embodiment may include the first switching element QH, the second switching element QL and the third switching element Qc provided as a TFT, and a first liquid crystal capacitor C1 and a second liquid crystal capacitor C2 which may include a dielectric material including the liquid crystal layer 300.

Sources of the first switching element QH and the second switching element QL, that is, input terminals may be connected to the data line DL, gates of the first switching element QH and the second switching element QL, that is, control terminals may be connected to the gate line GL, and a gate of the third switching element Qc, that is, a control terminal may be connected to the gate line GL.

A connection point CP between the drain of the second switching element QL and the source of the third switching element Qc may be connected to the second subpixel electrode 191L of the second liquid crystal capacitor C2, and the drain of the first switching element QH, that is, an output terminal may be connected to the first subpixel electrode 191H (refer to FIG. 1) of the first liquid crystal capacitor C1. Other ends of the first and second liquid crystal capacitors C1 and C2 may be connected to the common electrode 270. The drain of the third switching element Qc, that is, an output terminal may be connected to the sustain electrode line 135 (refer to FIG. 1). The second subpixel electrode 191L (refer to FIG. 1) may be electrically connected to the voltage dividing reference line RL through the third switching element Qc.

When a gate on signal Von is applied to the gate line GL, the first switching element QH, the second switching element QL and the third switching element Qc connected to the gate line GL may be turned on. Thus, the data voltage applied to the data line DL may be applied to the first subpixel electrode 191H through the turned-on first switching element QH. The voltage applied to the second subpixel electrode 191L may be divided through the third switching element Qc connected in series with the second switching element QL. Thus, the voltage applied to the second subpixel electrode 191L may be lower than the voltage applied to the first subpixel electrode 191H.

Thus, the voltage charged in the first liquid crystal capacitor C1 and the voltage charged in the second liquid crystal capacitor C2 may be different from each other. Since the voltage charged in the first liquid crystal capacitor C1 and the voltage charged in the second liquid crystal capacitor C2 may be different from each other, tilt angles of the liquid crystal molecules in the first subpixel PXH and the second subpixel PXL may be different from each other, thus enabling the two subpixels to have luminances different from each other.

When the voltage charged in the first liquid crystal capacitor C1 and the voltage charged in the second liquid crystal capacitor C2 are properly adjusted, the image viewed from the side may become as close as possible to the image viewed from the front, thereby improving side visibility of the LCD.

In the illustrated embodiment, to make the voltage charged in the first liquid crystal capacitor C1 and the voltage charged in the second liquid crystal capacitor C2 different from each other, the third switching element Qc is connected to the second liquid crystal capacitor C2 and the voltage dividing reference line RL, however, the second liquid crystal capacitor C2 may be connected to a step-down capacitor in the LCD according to another exemplary embodiment of the invention.

Specifically, the third switching element may include a first terminal connected to the step-down gate line, a second terminal connected to the second liquid crystal capacitor C2, and a third terminal connected to the step-down capacitor, thereby enabling a part of the electric charge charged in the second liquid crystal capacitor C1 to be charged in the step-down capacitor so as to set the charge voltage of the first liquid crystal capacitor C1 and the charge voltage of the second liquid crystal capacitor C2 to be different from each other. Furthermore, in the LCD according to another exemplary embodiment of the invention, the first liquid crystal capacitor C1 and the second liquid crystal capacitor C2 may be connected respectively to the different data lines to receive different data voltages applied thereto, thereby setting the charge voltage of the first liquid crystal capacitor C1 and the charge voltage of the second liquid crystal capacitor C2 to be different from each other. In addition, the charge voltage of the first liquid crystal capacitor C1 and the charge voltage of the second liquid crystal capacitor C2 may be set to be different from each other in various other ways.

The pixel electrodes 191 will be described in detail with reference to FIG. 4. In an exemplary embodiment, the pixel PX may have a substantially rectangular shape, the pixel electrodes 191 may be arranged to cover the corresponding pixels PX, and the common electrode 270 may be arranged integrally with the whole of the second panel 200, for example.

When an electric field is generated in the liquid crystal layer 300 by applying a potential difference between the pixel electrodes 191 and the common electrode 270, the major axes of the liquid crystal molecules 302 may be aligned vertical to the electric field. The polarization of the light incident to the liquid crystal layer 300 may vary depending on the degree of tilt of the liquid crystal molecules 302, and the variation of the polarization may be presented as a transmittance variation by the first and second polarization plates 140 and 240, thus enabling the LCD to display images.

A pattern may be provided between the pixel electrodes 191 and the common electrode 270 so as to form a plurality of domains to improve viewing angle of the LCD which displays images.

Specifically, the pixel PX may include, for example, the common electrode 270 corresponding to one pixel electrode 191. In this case, the pixel electrodes 191 may be patternized as described above, thereby enabling the liquid crystal molecules 302 having different average azimuthal angles to be divided into a plurality of domains having different directions in one pixel PX. The liquid crystal molecules 302 having an average azimuthal angle will be hereinafter referred to as an average liquid crystal azimuthal angle 310.

As described above, the pixel electrodes 191 and protrusions 198H (refer to FIGS. 1) and 198L (refer to FIG. 1) may be arranged in the pixel PX region divided into a plurality of domains having different directions. The pixel electrode 191 may include the first subpixel electrode 191H (refer to FIGS. 1 and 2) and the second subpixel electrode 191L (refer to FIGS. 1 and 2) as mentioned above. For convenience of description, the protrusions 198H and 198L disposed respectively in the first subpixel electrode 191H and second subpixel electrode 191L will be hereinafter referred to as protrusions 198, and peripheral bundle electrodes 193H and 193L will be hereinafter referred to as a peripheral bundle electrode 193.

The protrusions 198 may be arranged along an edge of the pixel PX region. The peripheral bundle electrode 193 may be arranged in parallel to the protrusions 198 in the pixel PX region. The peripheral bundle electrode 193 may be disposed to contact the protrusions 198, or a part of the peripheral bundle electrode 193 may be disposed to be overlaid on the protrusions 198. As another example, the peripheral bundle electrode 193 may be overlaid on the protrusions 198.

In this case, the protrusions 198 and the peripheral bundle electrode 193 may be disposed on at least one side of the pixel PX when the pixel PX has a rectangular shape, for example. That is, edges of the protrusions 198 and the peripheral bundle electrode 193 may be provided integrally with one side of at least one pixel PX. Furthermore, parts of the edges of the protrusions 198 and the peripheral bundle electrode 193 may be provided integrally with each other.

The protrusions 198 and the peripheral bundle electrode 193 may be disposed in at least one of a plurality of domains Da, Db, Dc and Dd. In the exemplary embodiment, the peripheral bundle electrode 193 is disposed in parallel to horizontal and vertical stems 192a and 192b in the first to fourth domains Da, Db, Dc and Dd, but the invention is not limited thereto.

In an exemplary embodiment, each of the protrusions 198 and the peripheral bundle electrode 193 may have a width ranging from about 7 micrometers (μm) to about 9 μm. In an exemplary embodiment, the width of the protrusions 198 may range from about 3 μm to about 5 μm.

The protrusions 198 and the peripheral bundle electrode 193 may be partially overlaid. To align the protrusions 198 and the peripheral bundle electrode 193, a partially overlaid region may be generated. However, the smaller the region where the protrusions 198 and the peripheral bundle electrode 193 are overlaid with each other, the more the area where the peripheral bundle electrode 193 is exposed increases, thereby improving transmittance.

In an exemplary embodiment, the protrusions 198 may have a height in a cross sectional direction ranging from about 0.5 μm to about 2 μm. When the height of the protrusions 198 is too high, the protrusions 198 may be overlapped with a cell gap of the liquid crystal layer 300, and then the height of the protrusions 198 may become the same as the height of a spacer. When the height of the protrusions 198 became the same as the height of the spacer, the flow of liquid crystals around the protrusions 198 is not smooth, causing a dark spot defect around the protrusions 198. Furthermore, when the height of the protrusions 198 is too low, it may be difficult to form a pretilt angle of the liquid crystals from a stepped surface of the protrusions 198. Thus, the height of the protrusions 198 may range from about 0.5 μm to about 2 μm.

As shown in the drawing, the pixel electrodes 191 may be disposed along the edge of the pixel PX and include the peripheral bundle electrode 193, and the horizontal stem 192a and the vertical stem 192b which are connected to the peripheral bundle electrode 193 and which divide the pixel PX into a plurality of domains. In this case, a micro branch 194 extending to the horizontal stem 192a and the vertical stem 192b is provided on the plurality of domains divided by the horizontal stem 192a and the vertical stem 192b. The micro branch 194 may include branched finger electrodes 194a, 194b, 194c and 194d disposed in the respective domains.

Furthermore, the branched finger electrodes 194a, 194b, 194c and 194d may be partially removed so as to define, in the pixel PX, a slit pattern 195 where an insulation layer including the protective layer 180 disposed under the pixel electrodes 191 is exposed. The slit pattern 195 may space the branched finger electrodes 194a, 194b, 194c and 194d apart from each other. The slit pattern 195 enables at least one of the branched finger electrodes 194a, 194b, 194c and 194d to have one end extending to a stem 192 and the other end extending to the peripheral bundle electrode 193.

As described above, the protrusions 198 and pixel electrodes 191 may be disposed in one pixel PX, and the protrusions 198 may be disposed to enclose edges of the pixel electrodes 191. Each pixel 191 includes the peripheral bundle electrode 193 disposed to contact the protrusions 198 and arranged in the direction parallel to the protrusions 198, horizontal and vertical stems 192a and 192b which are connected to the peripheral bundle electrode 193 and which divide the pixel PX into a plurality of domains, and the micro branch 194 extended to the horizontal and vertical stems 192a and 192b and connected to the peripheral bundle electrode 193, the peripheral bundle electrode 193, the horizontal and vertical stems 192a and 192b and the micro branch 194 being integrally provided. The peripheral bundle electrode 193, the horizontal stem 192a and the vertical stem 192b, and the branched finger electrodes 194a, 194b, 194c and 194d which are integrally provided may receive the same voltage applied thereto. Furthermore, a plurality of domains may be provided by the horizontal stem 192a and the vertical stem 192b while receiving the same voltage.

Thus, the pixel PX may include four domains, that is, the first to fourth domains Da, Db, Dc and Dd, including the horizontal stem 192a and the vertical stem 192b of the pixel electrode 191 as a boundary. In an exemplary embodiment, the width of the stem 192 may be basically approximately about 2 μm to about 5 μm, and may be adjusted to improve liquid crystal controllability according to circumstances.

In other words, the liquid crystal molecules 302 may not be laid on the region where the stem 192 is disposed, thereby causing a reduction in an aperture ratio. When the width of the stem 192 is large, a fringe field increases at the boundaries among the first to fourth domains Da, Db, Dc and Dd, which might cause a reduction in an aperture ratio and transmission, and therefore, the width of the stem 192 may be adjusted to prevent a reduction in the transmittance of the pixel PX. Different from those in FIG. 4, an area of an electrode in an intersection between the horizontal stem 192a and the vertical stem 192b may be adjusted.

The first to fourth domains Da, Db, Dc and Dd may divide the pixel PX by means of the horizontal stem 192a and the vertical stem 192b of the pixel electrode 191. Furthermore, the micro branch 194 extending from each of the horizontal stem 192a and the vertical stem 192b may be disposed in the pixel PX. The micro branch 194 may include a plurality of first to fourth branched finger electrodes 194a, 194b, 194c and 194d disposed respectively in the first to fourth domains Da, Db, Dc and Dd. Hereinafter, the first to fourth branched finger electrodes 194a, 194b, 194c and 194d may be collectively referred to as branched finger electrodes 194a, 194b, 194c and 194d.

Among the micro branches 194, the first micro branched finger electrode 194a may be disposed in the first domain Da and extend obliquely right upward from the horizontal stem 192a and the vertical stem 192b, and the second micro branched finger electrode 194b may be disposed in the second domain Db and extend obliquely left upward from the horizontal stem 192a and the vertical stem 192b. In addition, the third micro branched finger electrode 194c may be disposed in the third domain Dc and extend obliquely left downward from the horizontal stem 192a and the vertical stem 192b, and the fourth micro branched finger electrode 194d may be disposed in the fourth domain Dd and extend obliquely right downward from the horizontal stem 192a and the vertical stem 192b.

In an exemplary embodiment, the first and second micro branched finger electrodes 194a and 194b may be disposed at an angle of approximately 45 degrees (°) or approximately 135° with respect to a horizontal stem 192a. In an exemplary embodiment, the third and fourth micro branched finger electrodes 194c and 194d may be disposed at an angle of approximately 225° or approximately 315° with respect to the horizontal stem 192a. The branched finger electrodes 194a, 194b, 194c and 194d of the two neighboring domains Da to Dd may be disposed in the directions intersecting with each other.

In other words, the branched finger electrodes 194a, 194b, 194c and 194d may be arranged in such a manner that the branched finger electrode 194a may extend in the direction ranging from approximately 30° to 60°, for example, in the first domain Da, for example, with respect to the polarization axes of the polarization plates 140 and 240.

When the micro branch 194 extends from either the horizontal stem 192a or the vertical stem 192b, liquid crystal controllability may be improved, texture may be reduced and transmittance may be improved. The branched finger electrodes 194a, 194b, 194c and 194d may be disposed to be symmetrical with each other in the respective domains. That is, ends of the branched finger electrodes 194a, 194b, 194c and 194d may be disposed to correspond to the ends of the branched finger electrodes 194a, 194b, 194c and 194d in the adjacent pixel PX.

In an alternative exemplary embodiment, the branched finger electrodes 194a, 194b, 194c and 194d may asymmetrically extend. That is, ends of the branched finger electrodes 194a, 194b, 194c and 194d may be disposed to correspond to the slit pattern 195 of the adjacent pixel PX. When the branched finger electrodes 194a, 194b, 194c and 194d are asymmetrically extended, performance such as liquid crystal controllability may be effectively improved. That is, the branched finger electrodes 194a, 194b, 194c and 194d and the slit patterns 195 may be disposed alternately with each other in the domain and the adjacent domain.

As described above, protrusions 198 are disposed in the edge region of the pixel PX, and the pixel electrode 191 including the peripheral bundle electrode 193 disposed in parallel to the protrusions 198, the horizontal and vertical stems 192a and 192b connected to the peripheral bundle electrode 193 so as to divide the pixel PX into a plurality of domains, and the micro branch 194 extending in a diagonal direction with respect to the intersection between the horizontal and vertical stems 192a and 192b is disposed in the pixel, thereby forming the liquid crystal molecules 302 having the average liquid crystal azimuthal angle 310, in which the maximum transmittance may be provided.

Sides of the first to fourth micro branched finger electrodes 194a, 194b, 194c and 194d may distort an electric field so as to provide a horizontal component which determines the tilt direction of the liquid crystal molecules 302. The horizontal component of the electric field may enable the liquid crystal molecules 302 to behave and be aligned in the direction parallel to the lengthwise direction of the first to fourth micro branched finger electrodes 194a, 194b, 194c and 194d. Thus, as described with reference to FIGS. 1 to 4, the liquid crystal molecules 302 may tilt in the direction parallel to the lengthwise direction of the micro branched finger electrodes 194a, 194b, 194c and 194d. Since one pixel electrode 191 may include four domains Da to Dd in which the lengthwise directions of the micro branched finger electrodes 194a, 194b, 194c and 194d differ from each other, the liquid crystal molecules 302 may tilt in substantially four directions, and the four domains Da to Dd in which the liquid crystal molecules 302 are aligned in different directions may be provided in one subpixel.

In addition, the liquid crystal molecules 302 aligned irregularly in edges of the domains may be realigned in the direction similar to the average liquid crystal azimuthal angle 310 through the protrusions 198 and the peripheral bundle electrode 193.

The branched finger electrodes 194a, 194b, 194c and 194d and the slit pattern 195 may have the same width. Furthermore, the peripheral bundle electrode 193 may have a width same as those of the branched finger electrodes 194a, 194b, 194c and 194d. Here, the width may be taken in a direction perpendicular to an extension direction. In this case, the width of the peripheral bundle electrode 193 may range from about 1 µm to about 5 µm, for example. Specifically, the width of the peripheral bundle electrode 193 may range from about 2 µm to about 4 µm, for example.

As described above, the force of the electric field among the branched finger electrodes 194a, 194b, 194c and 194d and the width between the peripheral bundle electrode 193 and the branched finger electrodes 194a, 194b, 194c and 194d are set to be similar with each other, thereby maintaining the force of the electric field constant. Thus, the liquid crystal molecules 302 are prevented from being biased in any one direction.

In an exemplary embodiment, a pitch of each of the branched finger electrodes 194a, 194b, 194c and 194d and the slit pattern 195 may range from about 4 µm to about 8 µm, for example. More specifically, the pitch of the branched finger electrodes 194a, 194b, 194c and 194d and the slit pattern 195 may range from about 5 µm to about 7 µm, for example.

In an exemplary embodiment, a length of each of the branched finger electrodes 194a, 194b, 194c and 194d, that is, the length of each of the branched finger electrodes 194a, 194b, 194c and 194d ranging from the intersection of the stems 192 to the edge region of the pixel PX may be a liquid crystal controllable distance and range from about 25 µm to about 30 µm, for example. Specifically, the distance from the intersection of the stems 192 to the edge region of the pixel PX contacting ends of the branched finger electrodes 194a, 194b, 194c and 194d may range about 26 µm to about 28 µm, for example.

When it is assumed that the liquid crystal molecule 302 having an average orientation direction obtained by averaging the orientation directions of the liquid crystal molecules 302 in the respective domains Da, Db, Dc and Dd is the average liquid crystal azimuthal angle 310, then the average liquid crystal azimuthal angle 310 may be laid in the direction obtained by summing up the vector obtained from the electric field of the relevant domains Da, Db, Dc and Dd under an electric field and the vector obtained from a liquid crystal collision. That is, the liquid crystal molecules 302 may form an azimuthal angle similar to the extended direction of the branched finger electrodes 194a, 194b, 194c and 194d. The liquid crystal molecules 302 may be aligned in the respective domains Da, Db, Dc and Dd to have the average liquid crystal azimuthal angle 310 in the directions indicated by arrows a, b, c and d in the top view.

Specifically, the liquid crystal molecules 302 may be disposed in the direction substantially parallel to the direction running from four parts where edges of the pixel electrode 191 extending in different directions meet with each other to the center of the horizontal and vertical stems 192a and 192b. Thus, the orientation of the director of the liquid crystal molecules 302 affected by an electric field may be similar to the extended direction of the branched finger electrodes 194a, 194b, 194c and 194d in the respective domains Da, Db, Dc and Dd, and the liquid crystal molecules 302 may tilt in four directions in total in the respective regions of the electric field generating electrodes.

As described above, the average liquid crystal azimuthal angle 310 of the liquid crystal molecules 302 may be provided in the direction similar to the extended direction of the branched finger electrodes 194a, 194b, 194c and 194d in the respective domains Da, Db, Dc and Dd.

In the exemplary embodiment, since the branched finger electrodes 194a, 194b, 194c and 194d of one pixel PX extend in four lengthwise directions in total, the liquid crystal molecules 310 may also tilt in four directions in total. When the direction in which the liquid crystal molecules 310 tilt is diversified as described above, transmittance and reference viewing angle of the LCD may be improved.

Figure 5:
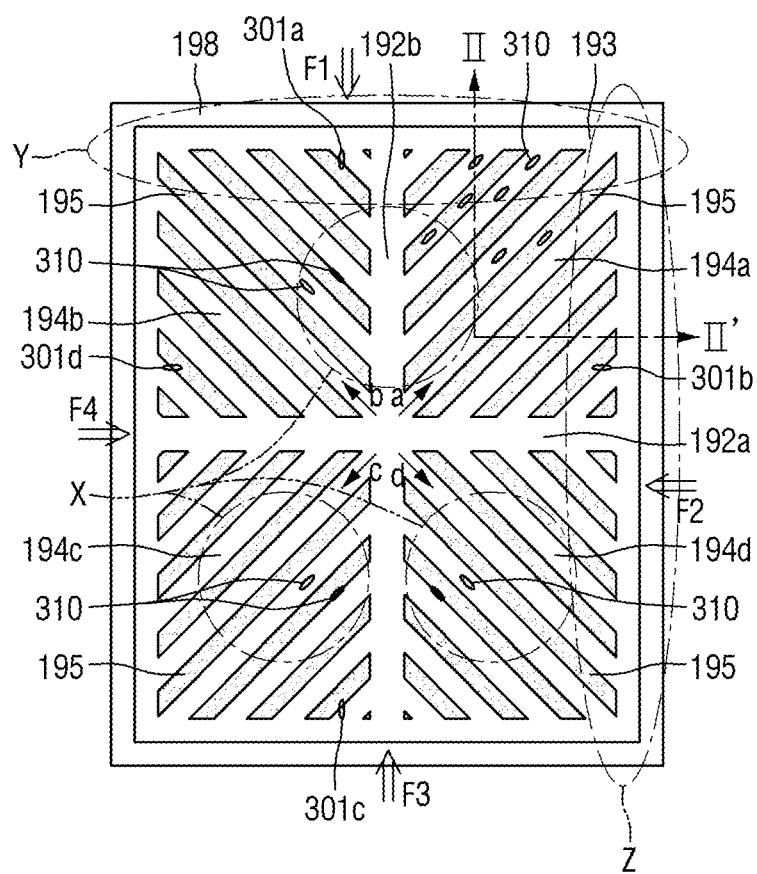
FIG. 5 illustrates the behavior of an exemplary embodiment of liquid crystals of the LCD according to the invention.
Figure 6:
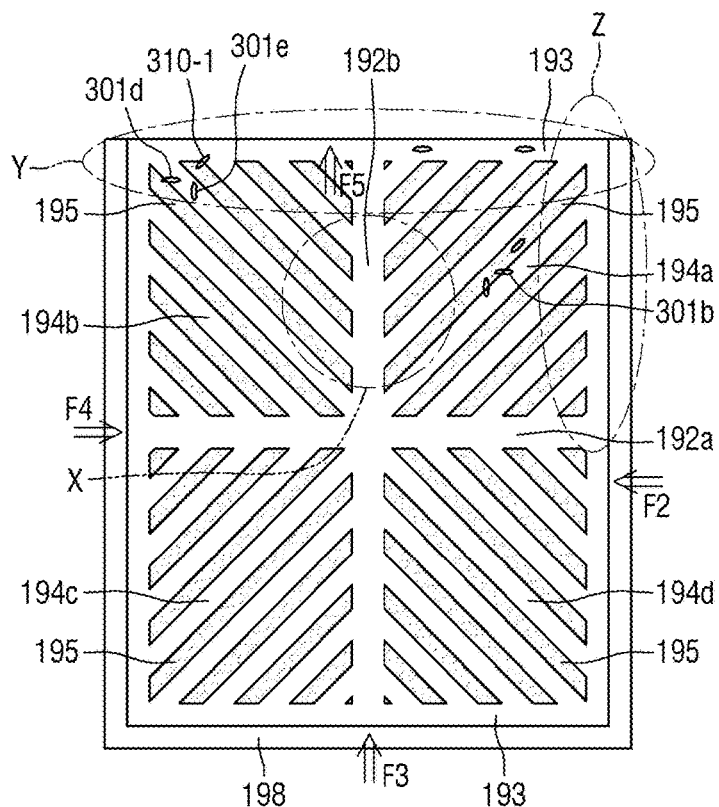
FIG. 6 is a top view illustrating another exemplary embodiment of the expanded one pixel according to the invention.
Figure 7:
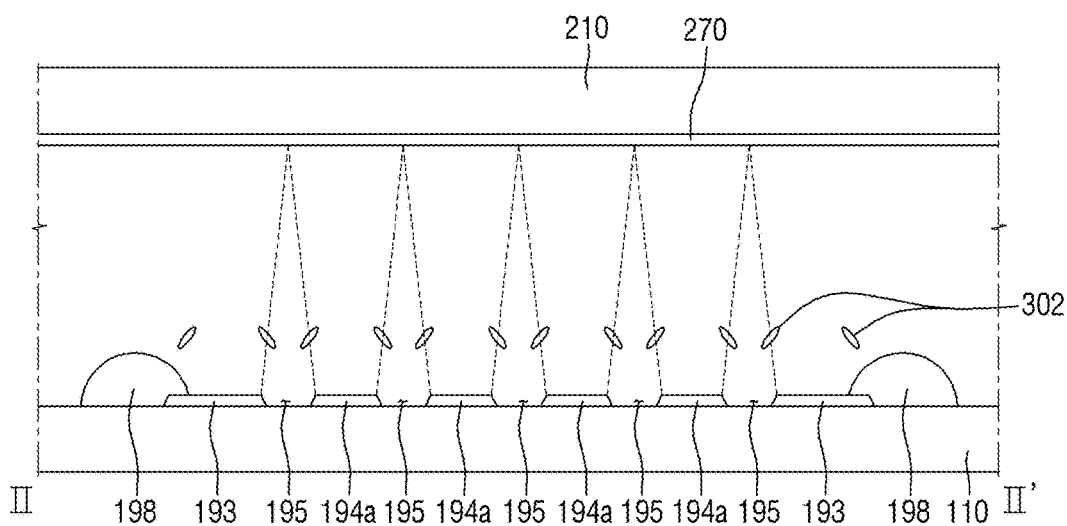
FIG. 7 is a cross-sectional view taken along line II-II' of FIG. 5.
Figure 8:
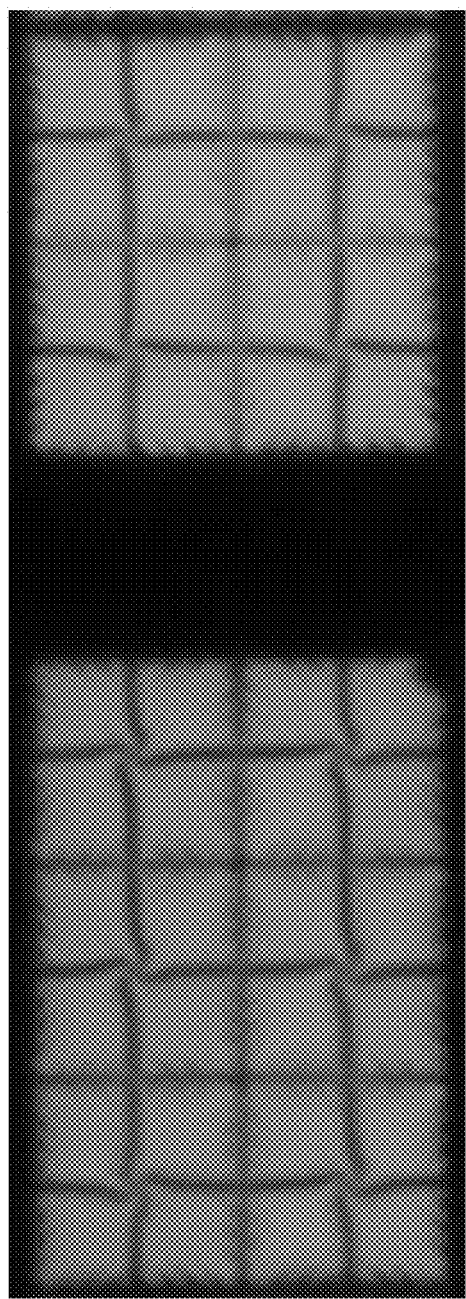
FIGS. 8 and 9 illustrate a plane of an exemplary embodiment of the pixel according to a comparative example and the invention.
Figure 9:
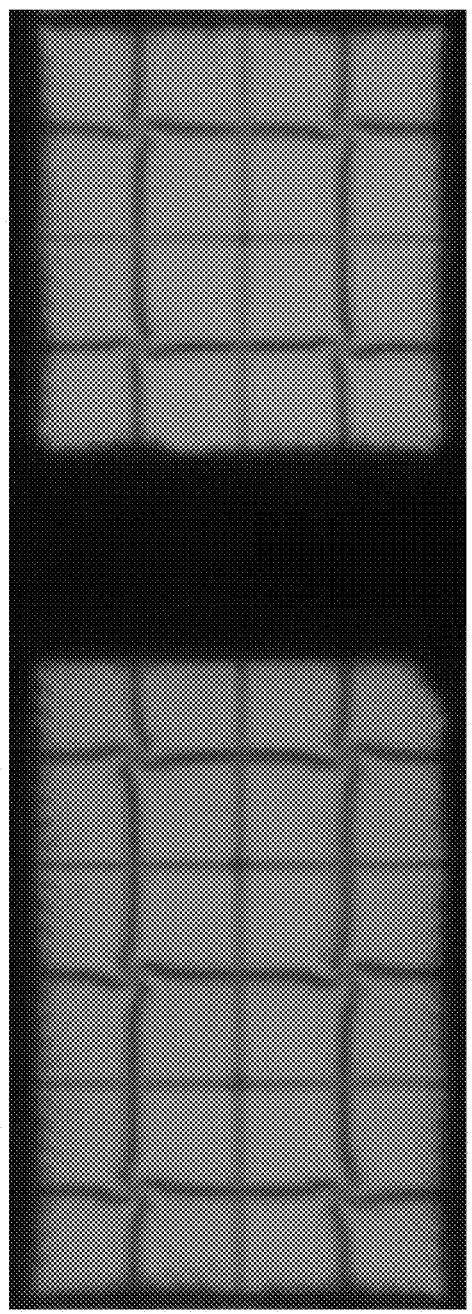

FIG. 5 illustrates the behavior of liquid crystals of the LCD according to an exemplary embodiment of the invention. FIG. 6 is a top view illustrating the expanded one pixel according to another exemplary embodiment of the invention. FIG. 7 is a cross-sectional view taken along line II-IF of FIG. 5. FIGS. 8 and 9 illustrate a plane of the pixel according to a comparative example and an exemplary embodiment of the invention.

Although FIGS. 5 to 7 illustrate one pixel PX of the LCD, the LCD may include a plurality of pixels arranged in columns and rows. In this case, the behavior of liquid crystals will be described by citing FIGS. 1 to 4, and one representative pixel will be illustrated as an example.

First, in the LCD according to the invention, the behavior of the liquid crystal molecules 302 may vary when a voltage is applied between the pixel electrode 191 and the common electrode 270, thereby changing the refractive index of liquid crystals and implementing gray level techniques.

While the LCD according to the invention may exhibit high contrast ratio due to excellent dark characteristics, the LCD according to the invention may use negative liquid crystals, which might cause a significant difference, depending on a view direction, in the transmittances of the liquid crystals based on the behavior of the liquid crystal molecules 302. That is, the LCD may have different transmittances depending on a view direction, thereby degrading viewing angle properties thereof.

To solve the viewing angle problems of the LCD, electrodes are provided respectively in the first panel 100 and second panel 200 so as to form a plurality of domain regions for varying the behavior directions of the liquid crystal molecules 302, as shown in FIGS. 1 and 2. In this case, the electrodes may be the pixel electrode 191, the common electrode 270 or the like.

As described above, the plurality of domains Da to Dd may be provided to minimize the difference in the refractive indices of liquid crystals resulting from a viewing angle direction, thereby improving visibility. However, although the difference in the refractive indices of liquid crystals resulting from a viewing angle direction is minimized by the structure of the plurality of domains Da to Dd, problems of a distorted grey level at a side still exists.

The structure of the plurality of domains Da to Dd may cause problems of lowered optical efficiency at the side of the pixel PX due to a disclination line. This is because a part of the liquid crystal molecules 302 behaves in the direction conforming to the polarization axes of the polarization plates 140 and 240 so as to cause a disclination line when a bright state or a dark state is realized.

To solve these problems, the electrode patterns 191 and 270 may be modified to reduce a grey level curve distortion in a low grey level section (dark state) and a high grey level section (bright state) as described with reference to FIGS. 1 and 2. Furthermore, a difference in transmittances for a high grey level and a low grey level is reduced to minimize a distortion of a gamma curve, thereby improving visibility.

The behavior of the liquid crystal molecules will hereinafter be explained in detail. FIGS. 5 to 7 illustrate one pixel to describe the behavior of the liquid crystals.

FIG. 5 illustrates an exemplary embodiment where the peripheral bundle electrode 193 is disposed at both sides and upper and lower parts of the pixel PX, and FIG. 6 illustrates an exemplary embodiment where the peripheral bundle electrode 193 is disposed at both sides of the pixel PX. FIG. 7 illustrates a cross-sectional surface of the edge region of the pixel to describe the behavior of the liquid crystals.

The behavior of the liquid crystal molecules 302 will be described with reference to FIGS. 5 to 7. A data voltage may be applied to the pixel electrode 191 and a common voltage may be applied to the common electrode 270, thereby generating an electric field in the liquid crystal layer 300 interposed between the two electric field generating electrodes.

Fringe fields F1 to F4 may be generated by the common electrode 270 and the slit pattern 195 of the pixel electrode 191 in the liquid crystal molecules 302 of the liquid crystal layer 300 in response to the electric field. Hereinafter, a horizontal electric field component in a first direction for enabling the liquid crystal molecule 302 to behave by the fringe field will be referred to as a first horizontal electric field F1, a horizontal electric field component in a second direction will be referred to as a second horizontal electric field F2, a horizontal electric field component in a third direction will be referred to as a third horizontal electric field F3, and a horizontal electric field component in a fourth direction will be referred to as a fourth horizontal electric field F4.

In this case, the fringe field may include a first director 301a of the liquid crystal molecule 302 caused by the first horizontal electric field F1 generated from upper sides of the first domain Da and the second domain Db toward the inside of the pixel PX, and a second director 301b of the liquid crystal molecule 302 caused by the second horizontal electric field F2 generated from right sides of the first domain Da and the fourth domain Dd toward the inside of the pixel PX, the upper sides of the first and second domains Da and Db and the right sides of the first and fourth domains Da and Dd being the two edge sides of the pixel electrode 191.

In addition, the fringe field may include a third director 301c of the liquid crystal molecule 302 caused by the third horizontal electric field F3 generated from lower sides of the third domain Dc and the fourth domain Dd toward the inside of the pixel PX, and a fourth director 301d of the liquid crystal molecule 302 caused by the fourth horizontal electric field F4 generated from left sides of the second domain Db and the third domain Dc toward the inside of the pixel PX, the lower sides of the third and fourth domains Dc and Dd and the left sides of the second and third domains Db and Dc being the two edge sides of the pixel electrode 191.

As described above, the first to fourth directors 301a to 301d of the liquid crystal molecules 302 caused by the first to fourth horizontal electric fields F1 to F4 generated toward the inside of the pixel PX may tilt in substantially parallel to the polarization axes of the polarization plates 140 and 240. That is, the liquid crystal molecules 302 may tilt in four directions in total in one pixel PX.

More specifically, the first and second directors 301a and 301b of the liquid crystal molecules 302 in the portion adjacent to the edge of the pixel electrode 191 in one pixel PX may be vertical to the edge of the pixel electrode 191. As described above, the first to fourth directors 301a to 301d of the liquid crystal molecules 302 according to the fringe field generated by edges of the pixel electrode 191 in one pixel PX may be primarily determined. In this case, the first to fourth directors 301a to 301d of the liquid crystal molecules 302 according to the fringe field may have force to enable the liquid crystal molecules 302 to behave toward the inside of the pixel PX by the protrusions 198.

As described above, the liquid crystal molecules 302 which primarily behave in the direction in substantially parallel to the polarization axes of the polarization plates 140 and 240 by the fringe fields F1 to F4 generated by electrodes, the fringe fields including the first to fourth directors 301a to 301d.

The liquid crystal molecules 302 behaved by the first to fourth directors 301a to 301d may meet with each other inside the pixel PX and be aligned secondarily in the direction which may minimize a deformation. In this case, the secondary orientation direction of the first to fourth directors 301a to 301d may be the direction of the vector sum of the directions of the directors.

Thus, the direction in which the liquid crystal molecules 302 behave in the direction of the vector sum of the directions of the directors may form the average liquid crystal azimuthal angle 310 in the direction similar to the extended directions of the branched finger electrodes 194a, 194b, 194c and 194d in the respective domains Da, Db, Dc and Dd. That is, the liquid crystal molecules 302 may be aligned to have different average liquid crystal azimuthal angles 310 in the respective domains Da, Db, Dc and Dd in the pixel PX.

Furthermore, the first to fourth directors 301a to 301d may also be provided in the branched finger electrodes 194a, 194b, 194c and 194d disposed among first, second and third slit patterns 195a, 195b and 195c.

Specifically, sides of the branched finger electrodes 194a, 194b, 194c and 194d may distort an electric field so as to produce a horizontal component vertical to the sides of the branched finger electrodes 194a, 194b, 194c and 194d, and the tilt directions of the liquid crystal molecules 302 may be determined by the fringe fields F1 to F4. Thus, the liquid crystal molecules 302 may tend to tilt, at first, in the direction vertical to the sides of the branched finger electrodes 194a, 194b, 194c and 194d.

In this case, since the directions of the horizontal components of the electric fields produced by the sides of neighboring branched finger electrodes 194a, 194b, 194c and 194d may be opposite from each other and the spaces among the branched finger electrodes 194a, 194b, 194c and 194d are narrow, the liquid crystal molecules 302 which may tend to tilt in the opposite directions may tilt together in the direction parallel to the lengthwise directions of the branched finger electrodes 194a, 194b, 194c and 194d.

Thus, as described in the exemplary embodiment of the invention, the liquid crystal molecules 302 may tilt in the lengthwise directions of the branched finger electrodes 194a, 194b, 194c and 194d through two stages. Furthermore, the protrusions 198 may be disposed in the edge of the pixel PX while orienting the liquid crystal molecules 302 in the secondary stage such that the liquid crystal molecules 302 may be pre-tilted in the direction parallel to the lengthwise directions of the branched finger electrodes 194a, 194b, 194c and 194d, thereby enabling the liquid crystal molecules 302 to be aligned in the direction parallel to the lengthwise directions of the branched finger electrodes 194a, 194b, 194c and 194d.

As described above, the slit patterns 195 are defined inside the pixel PX such that the liquid crystal molecules 302 may tilt in the directions of the first to fourth directors 301a to 301d by being influenced by the fringe fields F1 to F4 inside the pixel PX, thereby improving a response speed of the LCD.

As described above, the average liquid crystal azimuthal angles 310 may be different from each other in the respective domains Da, Db, Dc and Dd due to the behavior of the liquid crystal molecules 302.

The director of the liquid crystal molecule 302 may be aligned obliquely in a right upward direction with reference to the horizontal stem 192a so as to define the average liquid crystal azimuthal angle 310 in direction a in the first domain Da of the pixel PX.

The director of the liquid crystal molecule 302 may be aligned obliquely in a left upward direction with reference to the horizontal stem 192a so as to define the average liquid crystal azimuthal angle 310 in direction b in the second domain Db of the pixel PX.

The director of the liquid crystal molecule 302 may be aligned obliquely in a left downward direction with reference to the horizontal stem 192a so as to define the average liquid crystal azimuthal angle 310 in direction c in the third domain Dc of the pixel PX.

The director of the liquid crystal molecule 302 may be aligned obliquely in a right downward direction with reference to the horizontal stem 192a so as to define the average liquid crystal azimuthal angle 310 in direction d in the second domain Dd of the pixel PX.

Thus, the liquid crystals may be controlled to have different orientation directions along the lengthwise directions of the branched finger electrodes 194a, 194b, 194c and 194d disposed in the respective domains, thereby improving side visibility of the LCD of the invention.

Referring back to FIG. 6, a region which is adjacent to the intersection between the stems 192 and in which the micro branch 194 is disposed is defined as a first region X in one pixel PX, and the liquid crystal molecules 302 may be provided in the direction of the average liquid crystal azimuthal angle 310 substantially similar to the extended directions of the branched finger electrodes 194a, 194b, 194c and 194d due to the force of the fringe fields F1 to F4 and a collision of the liquid crystal molecules 302 in the first region X.

Furthermore, a region of an upper side of the pixel PX among edges of the pixel PX, spaced apart from the stems 192, may be defined as a second region Y, and a region of a right side of the pixel electrode 191 among edges of the pixel electrode 191 may be defined as a third region Z. In FIG. 6, a region of the pixel electrode 191 in which the peripheral bundle electrode 193 and the protrusions 198 are provided, may be defined as the third region Z. In addition, a region in which protrusions 198 are not provided may be defined as the second region Y.

The protrusions 198 provided in the edge of the pixel PX may be absent in the second region Y, thereby forming a fifth horizontal electric field F5 component in the peripheral direction of the pixel PX.

A fifth director 301e may be provided in the second region Y by the fifth horizontal electric field F5 component. Thus, the fifth director 301e that behaves by the fifth horizontal electric field F5 component may collide against each of the adjacent second director 301b provided by the second horizontal electric field F2 and the fourth director 301d provided by the fourth horizontal electric field F4, thereby forming the liquid crystal molecule 302 having an azimuthal angle different from the average liquid crystal azimuthal angle 310 in the second region Y. The liquid crystal molecule 302 having the liquid crystal azimuthal angle may be referred to as a fifth azimuthal angle liquid crystal 310-1.

In an exemplary embodiment, the liquid crystal molecule 302 having the fifth azimuthal angle liquid crystal 310-1 with an azimuthal angle different from the average liquid crystal azimuthal angle 310 may cause a separation by approximately 45° with respect to a polarization axis, resulting in a degraded transmission and occurrence of texture, for example.

In the second region Y, a vector which enables the liquid crystal molecules 302 having the second director 301b to secondarily behave, that is, force of the first horizontal electric field F1, is weak, or the fifth horizontal electric field F5 opposite to the first horizontal electric field F1 may be generated, thereby allowing the liquid crystal molecules 302 to be laid in parallel to the horizontal stem 192a. Furthermore, the liquid crystal molecules 302 may behave from an acute angle to an obtuse angle due to the component of the fifth horizontal electric field F5 generated in the horizontal stem 192a.

Thus, a part of the liquid crystal molecules 302 disposed in the second region Y among the liquid crystal molecules 302 that behave by the fringe fields F1 to F4 may be aligned in the direction substantially parallel to the polarization axes of the polarization plates 140 and 240, or the fifth azimuthal angle liquid crystals 310-1 may be aligned from an acute angle to an obtuse angle in the second region Y.

The LCD may have the maximum transmittance when the design is such that the direction of the average liquid crystal azimuthal angle 310 has an angle of approximately 45° with respect to the polarization axes of the polarization plates 140 and 240 when voltages are applied to the first and second panels 100 and 200.

However, as described above, the fifth director 301e may be aligned in the direction substantially parallel to the polarization axes, or the fifth azimuthal angle liquid crystals 310-1 may be aligned from an acute angle to an obtuse angle in the second region Y of the pixel PX where protrusions 198 are not disposed. The second region Y of the pixel PX may degrade the transmittance of the LCD due to the liquid crystal molecules 302 laid in the direction similar to the polarization axes of the polarization plates 140 and 240. That is, the angle defined between the liquid crystal molecules 310 and the polarization axes of the polarization plates 140 and 240 gets far from approximately 45° to cause a reduction in light transmission in the second region Y.

On the contrary, since the protrusions 198 are arranged in the edge region of the pixel PX in the third region Z where the peripheral bundle electrode 193 and the protrusions 198 are provided, the liquid crystal molecules 302 may have a pretilt angle due to the protrusions 198 in the third region Z.

In other words, even when the fifth horizontal electric field F5 in which fringe fields having the direction opposite to the direction of the fringe fields in the first horizontal electric field F1 is generated in the third region Z, force of pushing the liquid crystal molecules 302 may be larger due to the pretilt angle defined by the protrusions 198, and thus the liquid crystal molecules 302 may be aligned in the direction similar to the average liquid crystal azimuthal angle 310 in the third region Z.

Since the liquid crystal molecules 302 may be aligned in the direction of the pretilt angle in the edge region of the pixel PX, that is, in the third region Z, the liquid crystal molecules 302 may be aligned to be relatively closer to the average orientation direction of the liquid crystal molecules 302, that is, the average liquid crystal azimuthal angle 310 in the respective domains Da to Dd. Thus, an irregular alignment of the liquid crystal molecules 302 which might occur in the second region Y, i.e., the edge region of the pixel PX, may be minimized.

As described above, the protrusions 198 may be provided at the side of the LCD so as to adjust the liquid crystal molecules 302 disposed in the direction similar to the polarization axes to have the average liquid crystal azimuthal angle 310, thereby improving transmittance in the third region Z and side viewing angle.

Referring to FIGS. 8 and 9, the protrusions 198 may be provided in the edge region of the pixel PX to enable the liquid crystal molecules 302 to have a pretilt angle oriented from the edge region of the pixel PX toward the inside of the pixel PX, thereby minimizing a horizontal electric field component which causes an irregular alignment of the liquid crystal molecules 302 and controlling the liquid crystal molecules 302 to have the average liquid crystal azimuthal angle 310. That is, the sum of a vector obtained from the electric field that determines the azimuthal angle of the liquid crystal molecules 302 and a vector obtained from a collision of the liquid crystal molecules 302, that is, components of both vectors, are controlled to align the liquid crystal molecules 302 to have the average liquid crystal azimuthal angle 310.

The protrusions 198 may be disposed in the edge region of the pixel PX so as to provide a vector to the liquid crystal molecules 302 which are disposed adjacent to the edge of the pixel electrode 191, thereby enabling the liquid crystal molecules 302 which are disposed adjacent to the edge of the pixel electrode 191 to be adjusted in being tilted in the direction similar to the polarization axes. That is, problems of degraded display quality which might occur when the liquid crystal molecules 302 are aligned in the direction parallel to the polarization axes in the edges of the pixel electrode 191, that is, the second and third regions Y and Z, may be avoided.

FIG. 8 illustrates a comparative example in which the protrusions 198 are disposed in the edge region of the pixel PX and no peripheral bundle electrode 193 is disposed in the edge region of the pixel PX. In this case, the protrusions 198 are disposed to adjust the liquid crystal molecules 302 to have the average liquid crystal azimuthal angle 310. In this comparative example, the pixel PX may have transmittance of about 88 percent (%).

Since no peripheral bundle electrode 193 is disposed in the edge region of the pixel PX, a horizontal electric field component may not be generated in the edge region of the pixel PX. It may be determined that a small number of liquid crystal molecules 302 among the liquid crystal molecules 302 behaves in the internal region of the pixel PX adjacent to the protrusions 198. In other words, it may be determined that the small number of liquid crystal molecules 302 are aligned at the average liquid crystal azimuthal angle 310 that enables the liquid crystal molecules 302 to behave to reach the maximum transmission, causing transmission degradation.

On the contrary, as shown in FIG. 8, it may be determined that the protrusions 198 and the peripheral bundle electrode 193 are disposed in the edge of the pixel PX, thereby improving transmission in the edge of the pixel PX.

The peripheral bundle electrode 193 and the protrusions 198 are disposed in one pixel PX so as to increase the number of liquid crystal molecules 302 behaving in the edge region of the pixel PX. That is, the number of liquid crystal molecules 302 having the average liquid crystal azimuthal angle 310 may be increased in the edge region of the pixel PX so as to improve transmission in the edge region of the pixel PX.

Electric fields are generated in the edge region of the pixel PX so as to control the azimuthal angle of liquid crystals to form the liquid crystal molecules 302 having an angle similar to the average liquid crystal azimuthal angle 310 in the edge region of the pixel, thereby improving transmittance of the LCD. In the exemplary embodiment, the pixel PX may have transmittance of about 95%.

As described above, the plurality of domains Da to Dd enables the liquid crystal molecules 302 to be tilted in various directions, and the peripheral bundle electrode 193 and the protrusions 198 are disposed in the edge of one pixel PX so as to increase the probability of forming the liquid crystal molecules 302 having the average liquid crystal azimuthal angle 310, thereby improving transmittance of the LCD.

FIGS. 10 to 15 are top views illustrating pixels of LCDs according to other exemplary embodiments of the invention. FIGS. 10 to 15 will be explained briefly by citing FIGS. 1 to 5 or an explanation thereof will be omitted to avoid duplication explanation.

The pixel electrodes 191 of the LCD of the invention will be explained briefly. The protrusions 198 and the pixel electrodes 191 may be disposed in one pixel PX, and the protrusions 198 may be disposed to enclose edges of the pixel electrodes 191. Each pixel 191 includes the peripheral bundle electrode 193 disposed to contact the protrusions 198 and arranged in the direction parallel to the protrusions 198, horizontal and vertical stems 192a and 192b which are connected to the peripheral bundle electrode 193 and which divide the pixel PX into a plurality of domains, and the micro branch 194 extended to the horizontal and vertical stems 192a and 192b and connected to the peripheral bundle electrode 193, the peripheral bundle electrode 193, the horizontal and vertical stems 192a and 192b and the micro branch 194 being integrally provided.

The micro branch 194 includes the plurality of branched finger electrodes 194a, 194b, 194c and 194d, and the branched finger electrodes 194a, 194b, 194c and 194d may be spaced apart from each other by the slit pattern 195. The slit pattern 195 may be provided by removing neighboring branched finger electrodes 194a, 194b, 194c and 194d and thus by exposing the insulation layer including the protective layer and the like disposed under the pixel electrodes 191.

Figure 10:
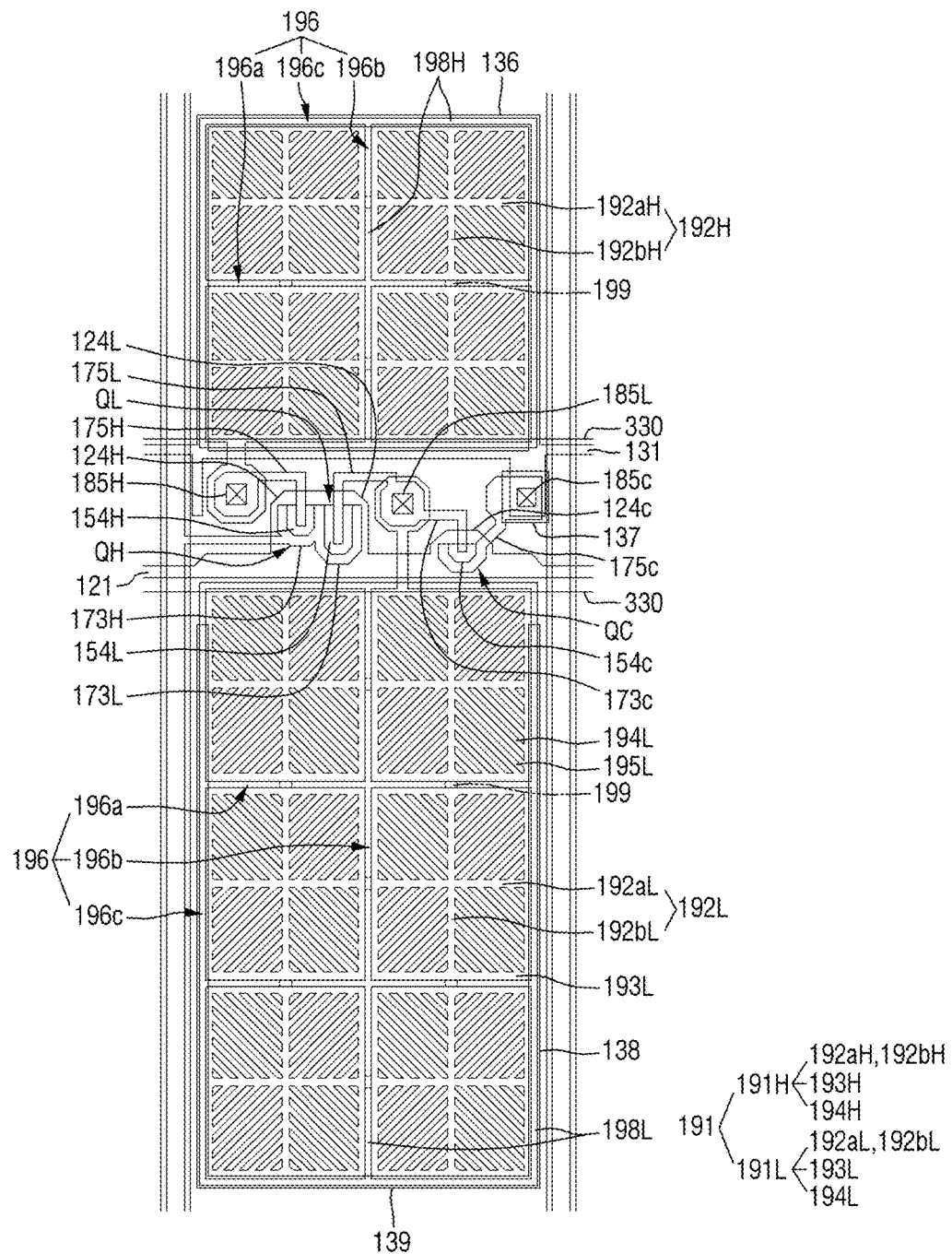
FIGS. 10 to 15 are top views illustrating other exemplary embodiments of pixels of LCDs according to the invention.
Figure 11:
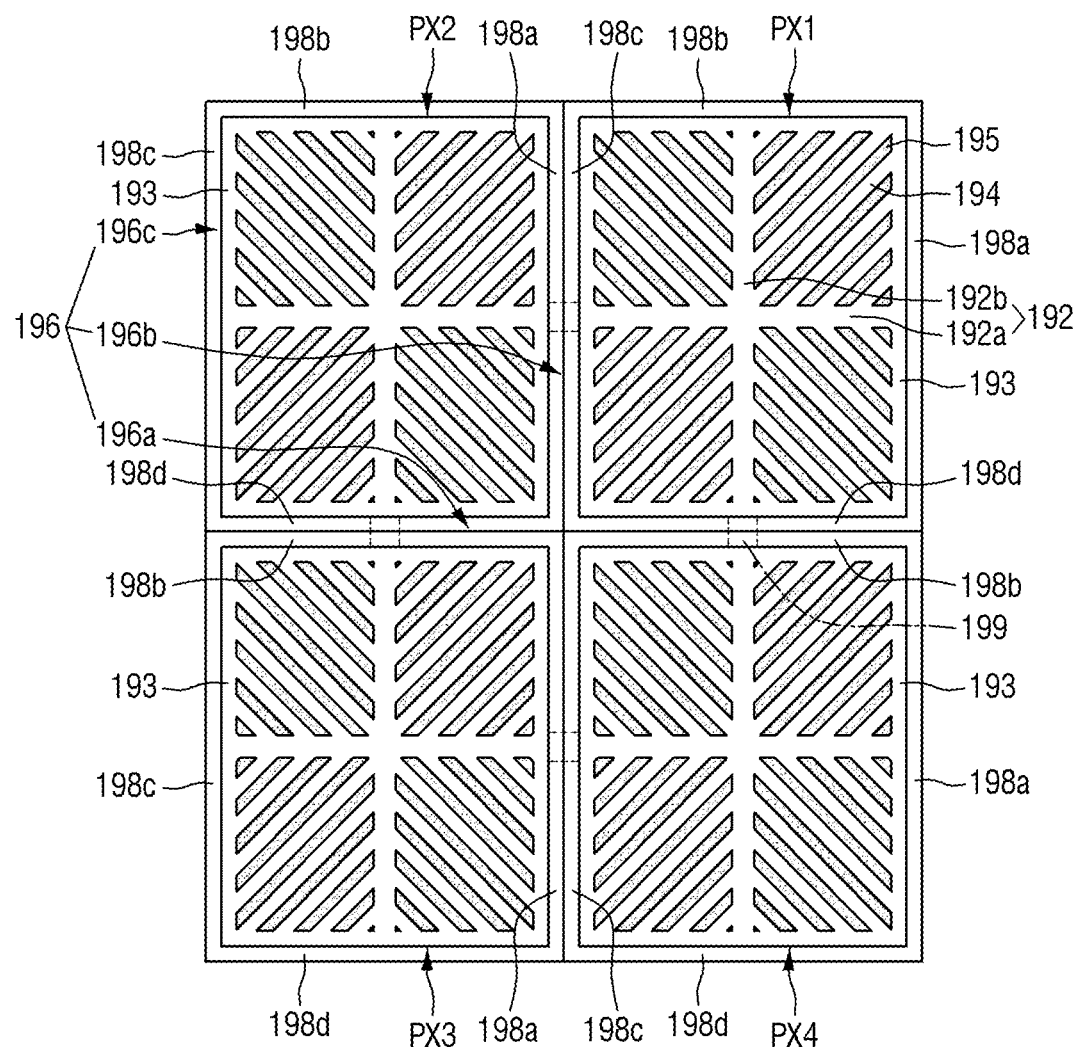

First, referring to FIGS. 10 and 11, the plurality of first and second subpixel electrodes 191H and 191L may be disposed respectively in the first and second subpixel PXH and PXL regions. Hereinafter, for convenience of explanation, the first and second subpixel PXH and PX regions will be explained as a subpixel PX region, and the first and second subpixel electrodes 191H and 191L will be explained as the subpixel electrodes 191.

The plurality of subpixel electrodes 191 may be disposed in the subpixel PX region, and the subpixel electrodes 191 may be disposed with a gap region 196 therebetween so as to space the subpixels 191 apart from each other. A connection electrode 199 may be disposed in the gap region 196 so as to interconnect neighboring subpixel electrodes 191 such that the same voltage may be applied to the subpixel electrodes 191. The gap region 196 may include a horizontal gap region 196a defined in a horizontal direction in the subpixel PX region and a vertical gap region 196b defined in a vertical direction. Furthermore, a rim gap region 196c may be disposed to space the gate lines and data lines 171 arranged along an edge of the subpixel PX region.

The protrusions 198H and 198L (hereinafter, referred to as protrusions 198) may be disposed in the gap region 196 for spacing the subpixel electrodes 191 apart from each other. That is, the protrusions 198 may be disposed on the horizontal and vertical gap regions 196a and 196b defined between the subpixel PX electrodes, and may be disposed on the rim gap region 196c defined along the edge of the subpixel PX region. The connection electrode 199 which interconnects the subpixel PX electrodes by the protrusions 198 disposed on the horizontal and vertical gap regions 196a and 196b may be arranged below the protrusions 198.

The horizontal and vertical gap regions 196a and 196b and the rim gap region 196c may have the same thickness, but the invention is not limited thereto. The thickness of the horizontal and vertical gap regions 196a and 196b may be less than the thickness of the rim gap region 196c when considering an aperture ratio of the pixel PX.

As described above, the protrusions 198 may be disposed in the edge of each subpixel PX region so as to form an electric field running toward the inside of the subpixel PX region. Furthermore, the peripheral bundle electrode 193 may be arranged inside the subpixel PX region so as to be adjacent to the protrusions 198, thereby forming a secondary alignment vector in the liquid crystal molecules 302 which are aligned on the region adjacent to the protrusions 198 of the subpixel PX region.

Thus, the irregularly aligned liquid crystal molecules 302 behave in the edge of the subpixel PX region so as to be aligned in the direction of the average liquid crystal azimuthal angle 310. Thus, transmittance in the edge of the subpixel PX region may be improved to achieve improved transmittance all over the pixel.

Referring to FIG. 11, the protrusions 198 may be disposed on the subpixel electrode 191 basis, that is, may be disposed in the respective edges of the subpixel electrodes 191, differently from FIG. 10 where the protrusions 198 are disposed on the subpixel PX region basis.

Thus, a single protrusion 198 may be disposed in the edge of the subpixel PX region. That is, a single protrusion 198 may exist in the rim gap region 196c. In an exemplary embodiment, two protrusions 198 may be disposed in each of the horizontal and vertical gap regions 196a and 196b.

In this case, the protrusion 198 disposed on the right side of the subpixel electrode 191 may be defined as a first protrusion 198a, the protrusion 198 disposed on the upper side of the subpixel electrode 191 may be defined as a second protrusion 198b, the protrusion 198 disposed on the left side of the subpixel electrode 191 may be defined as a third protrusion 198c, and the protrusion 198 disposed on the lower side of the subpixel electrode 191 may be defined as a fourth protrusion 198d.

Among the subpixel electrodes 191 disposed in the subpixel PX region, the subpixel electrode 191 disposed on the right upper side may be defined as a first sub-electrode PX1, the subpixel electrode 191 disposed on the left upper side may be defined as a second sub-electrode PX2, the subpixel electrode 191 disposed on the left lower side may be defined as a third sub-electrode PX3, and the subpixel electrode 191 disposed on the right lower side may be defined as a fourth sub-electrode PX4.

The protrusion 198 disposed along the edge of the subpixel PX region may contact the protrusion 198 disposed along the edge of the adjacent subpixel PX electrode 191.

Specifically, the third protrusion 198c of the first sub-electrode PX1 and the first protrusion 198a of the second sub-electrode PX2 may be disposed to contact with each other, and the fourth protrusion 198d of the second sub-electrode PX2 and the second protrusion 198b of the third sub-electrode PX3 may be disposed to contact with each other. In addition, the first protrusion 198a of the third sub-electrode PX3 and the third protrusion 198c of the fourth sub-electrode PX4 may be disposed to contact with each other, and the second protrusion 198b of the fourth sub-electrode PX4 and the fourth protrusion 198d of the first sub-electrode PX1 may be disposed to contact with each other.

As described above, the thickness of the protrusion 198 disposed in the rim gap region 196c and the thickness of the protrusion 198 disposed on the horizontal and vertical gap regions 196a and 196b may be different from each other due to the protrusions 198 disposed in the respective subpixel electrodes PX1 to PX4.

Figure 12:
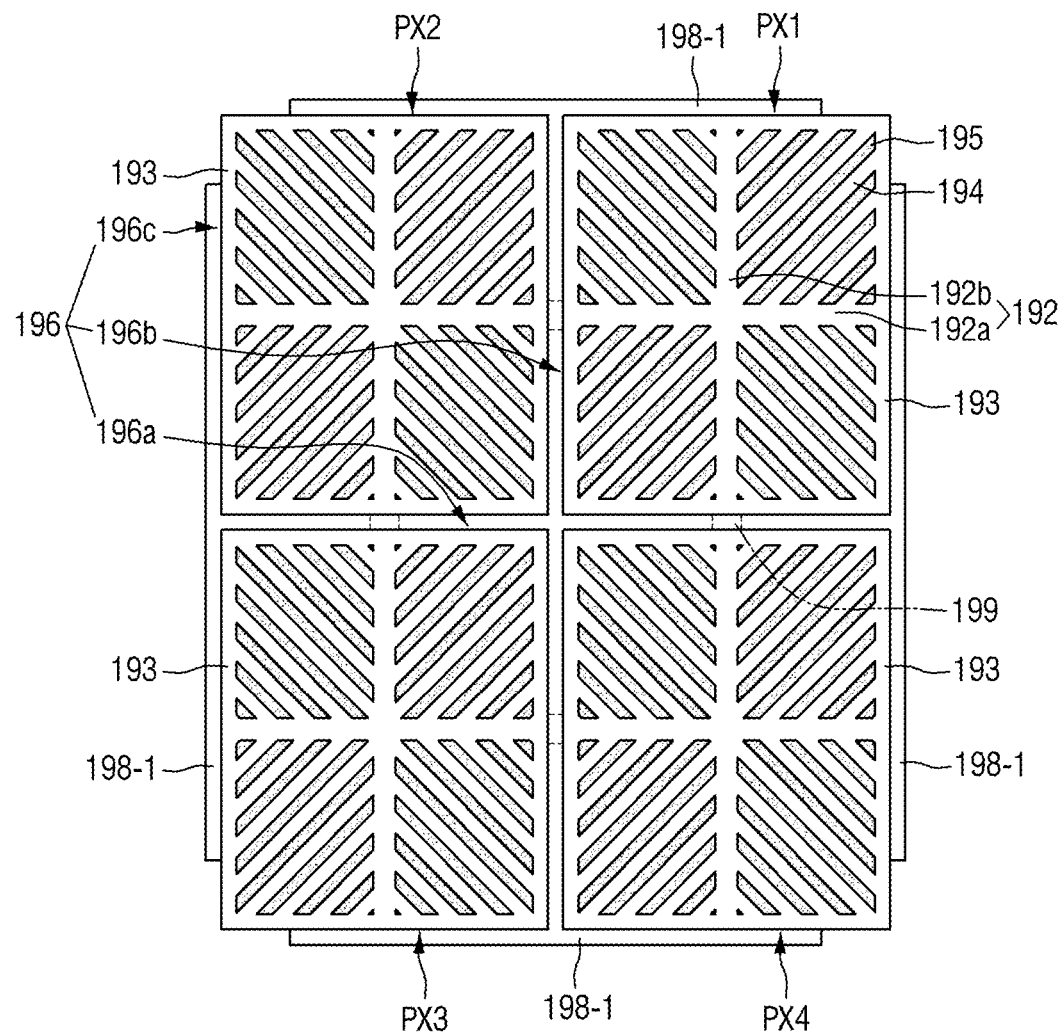
Figure 13:
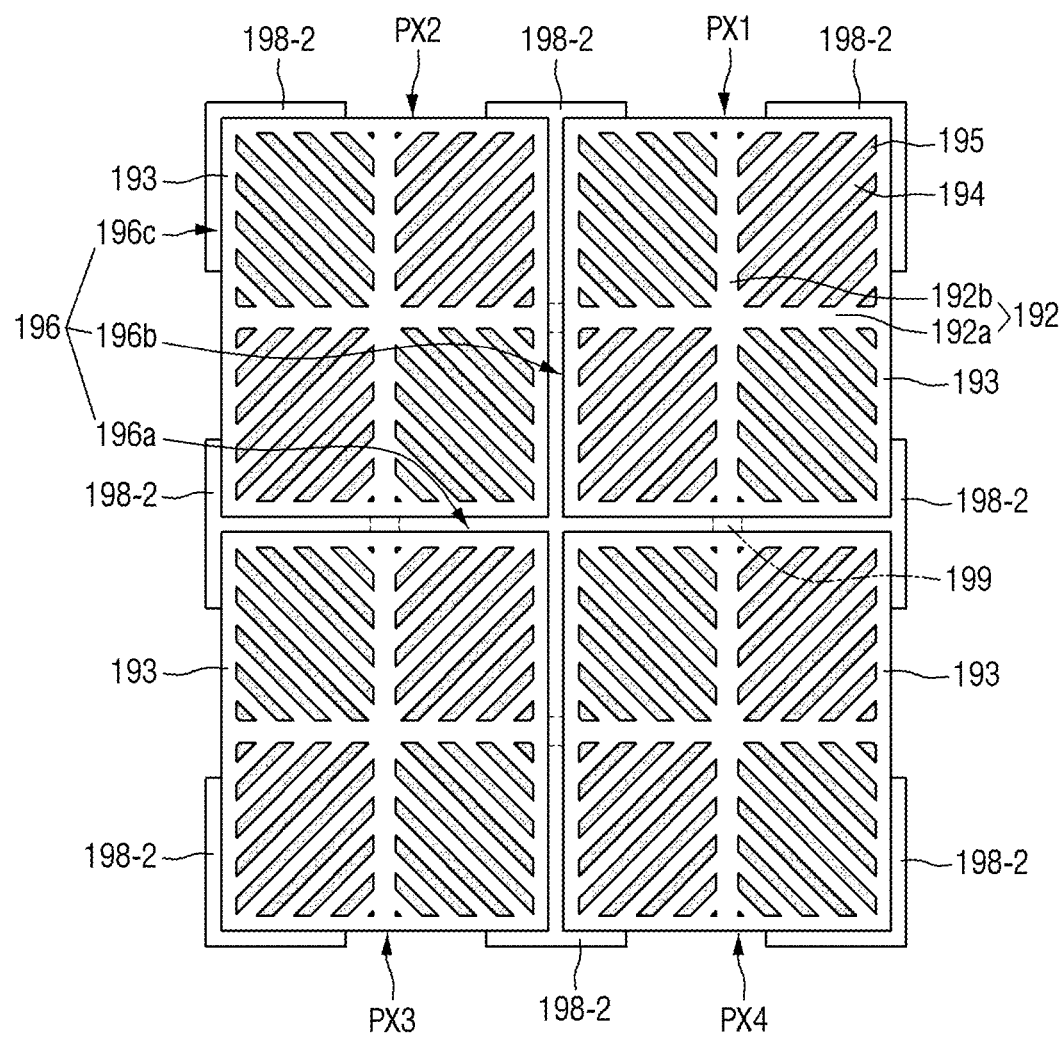

Referring to FIGS. 12 and 13, the shape of the protrusion 198 disposed in the subpixel PX region may be modified. For ease of explanation, identical reference numerals are used to designate identical regions by citing FIGS. 10 and 11.

As shown in FIG. 12, protrusions 198-1 may be disposed only in a part of the rim gap region 196c of the subpixel PX region differently from the protrusions 198 disposed in the rim gap region 196c. Specifically, in the first sub-electrode PX region, for example, a corner portion which interconnects the first and second protrusions 198a and 198b (refer to FIG. 11) of the first sub-electrode PX1 may be removed. Furthermore, the third and fourth protrusions 198c and 198d (refer to FIG. 11) may be disposed in the horizontal and vertical gap regions 196a and 196b of the first sub-electrode PX1. The third protrusion 198c may be shared with the first protrusion 198a of the second subpixel PX2, and the fourth protrusion 198d may be shared with the second protrusion 198b of the fourth subpixel PX4.

In the second, third and fourth sub-electrodes PX2, PX3 and PX4, the protrusion 198-1 may not be disposed in the corner portion of the subpixel PX region in the same manner as in sub-electrode PX1.

As described above, the protrusion 198-1 may be disposed in the edge of the subpixel PX region so as to provide a vector that enables the liquid crystal molecules 302 provided in the edge to secondarily collide. The secondary collision vector of the liquid crystal molecules 302 may enable the liquid crystal molecules 302 (refer to FIG. 2) to be laid in the direction of the average liquid crystal azimuthal angle 310 (refer to FIG. 4) for acquiring the maximum transmission. Thus, degradation of transmission which might occur in the edge region of the subpixel PX may be prevented.

As shown in FIG. 13, protrusions 198-2 may be disposed in the respective corner portions of the subpixel PX region, and the protrusions 198-2 may be disposed in the respective regions adjacent to the respective ends of the horizontal and vertical gap regions 196a and 196b.

First, it may be difficult to align the liquid crystal molecules 302 in the direction of the average liquid crystal azimuthal angle 310 at ends of the horizontal and vertical gap regions 196a and 196b. The liquid crystal molecules 302 may behave by the first horizontal electric field F1 component (refer to FIG. 5) and the second horizontal electric field F2 component (refer to FIG. 5), and the behaved liquid crystal molecules 302 may secondarily collide so as to be aligned at the average liquid crystal azimuthal angle 310 in the first domain Da. However, it may be difficult to align the liquid crystal molecules 302 in the direction of the average liquid crystal azimuthal angle 310 in the region adjacent to ends of the horizontal and vertical gap regions 196a and 196b since force of one of the electric fields acting in the region is larger.

The protrusions 198-2 may be provided in the region where the liquid crystal molecules 302 are irregularly aligned due to the forces of electric fields acting differently from each other, and the protrusions 198-2 may be removed in the region where the forces of electric fields act stably, thereby enabling the liquid crystal molecules 302 to be stably aligned.

In an exemplary embodiment, the region where the liquid crystal molecules 302 are irregularly aligned may be corner portions of the respective sub-electrodes PX1 to PX4, for example. Thus, the protrusions 198-2 may include rim protrusions 198-2 extending from the horizontal and vertical gap regions 196a and 196b so as to enclose the corner portions of the respective sub-electrode regions. The rim protrusions 198-2 may be disposed in a part of the rim gap region 196c. Furthermore, the protrusions 198-2 may include corner protrusions 198-2 disposed in the corner portions of the subpixel PX, specifically, corner portions exposed to the peripheries of the respective sub-electrodes PX1 to PX4.

As described above, the protrusions 198-2 and the peripheral bundle electrode 193 are disposed in the portion of the subpixel PX region where the liquid crystal molecules 302 are irregularly aligned so as to increase the liquid crystal molecules 302 behaving in the direction of the average liquid crystal azimuthal angle 310 in the portion of the subpixel PX region where the liquid crystal molecules 302 are irregularly aligned. Thus, the LCD may have improved transmittance.

Figure 14:
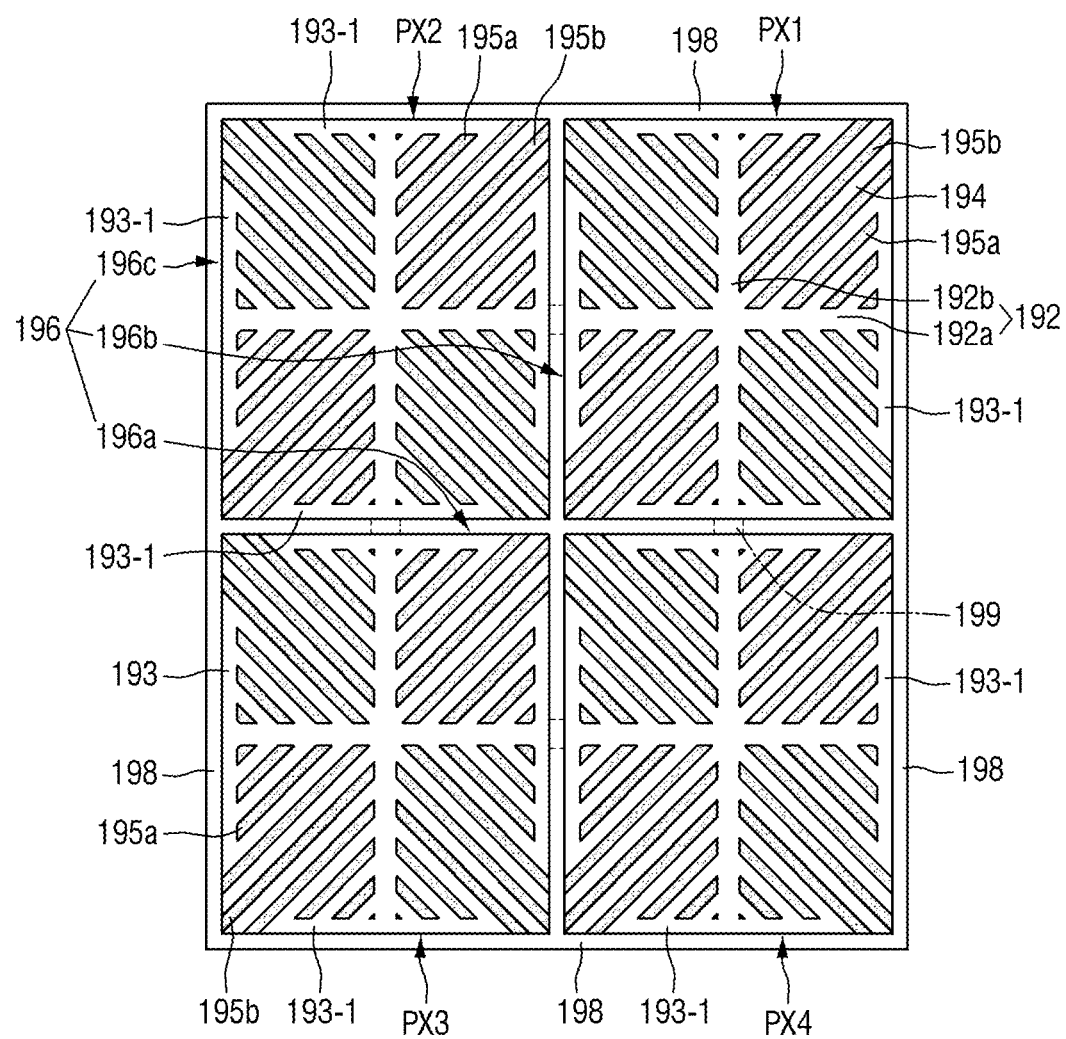

Referring to FIG. 14, a peripheral bundle electrode 193-1 may be partially removed in corner portions of the subpixel PX region.

The slit pattern 195 may be defined in two types in the subpixel PX region so as to modify the shape of the peripheral bundle electrode 193-1. A first slit pattern 195a one end of which contacts the stem 192 and the other end of which contacts the peripheral bundle electrode 193-1, and a second slit pattern 195b one end of which contacts the stem 192 and the other end of which contacts the protrusions 198 may be defined in the subpixel PX region.

In this case, the second slit pattern 195b may be defined in the corner portions of the subpixel PX region so as to modify the shape of the peripheral bundle electrode 193-1. A part of the peripheral bundle electrode 193-1 may be determined as an extension of a branched finger electrode depending on a view. That is, the part of the peripheral bundle electrode 193-1 in the corner portions of the subpixel PX region may be looked as an extension of the branched finger electrode 194 to the corner portions.

As described above, the protrusions 198 in the corner portions of the subpixel PX region may be removed so as to minimize the liquid crystal molecules 302 irregularly aligned in the corner portions due to the collision of the liquid crystal molecules 302. Thus, degradation of transmission which might occur in the corner portions of the subpixel PX region may be prevented.

Figure 15:
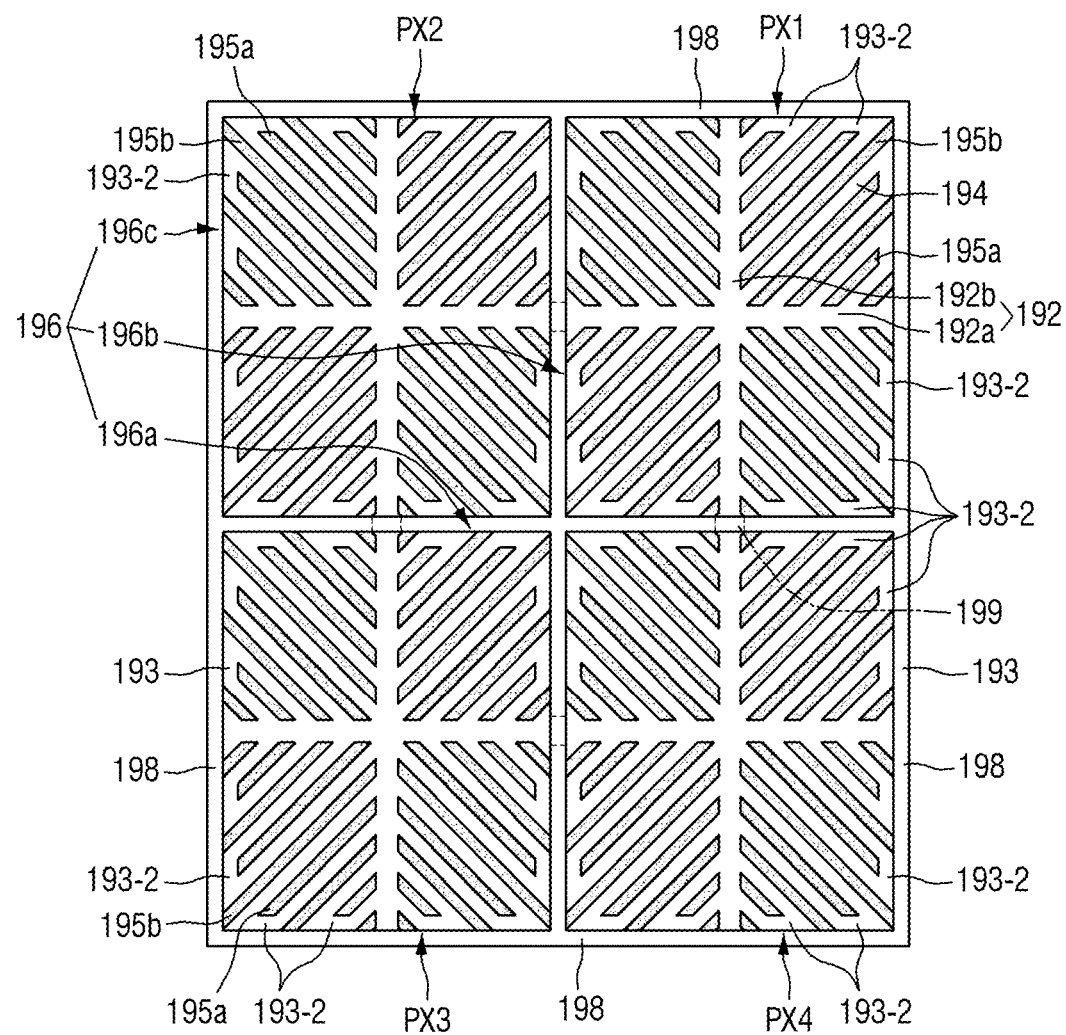

Referring to FIG. 15, dot-shaped peripheral bundle electrodes 193-2 may be spaced apart from each other or arranged in a stepping-stone manner in the edge of the subpixel PX region.

In this case, the slit pattern 195 may be defined in two types in the subpixel PX region. The first slit pattern 195a one end of which contacts the stem 192 and the other end of which contacts the peripheral bundle electrode 193-2, and the second slit pattern 195b one end of which contacts the stem 192 and the other end of which contacts the protrusions 198 may be defined in the subpixel PX region.

The first slit pattern 195a and the second slit pattern 195b may be alternately arranged so as to form dot-shaped peripheral bundle electrodes 193-2 in the subpixel PX region.

As described above, a secondary alignment vector may be provided in the liquid crystal molecules 302 which are aligned adjacent to the edge of the pixel electrode 191, thereby enabling the liquid crystal molecules 302 which are disposed adjacent to the edge of the pixel electrode 191 to be adjusted in being tilted in the direction vertical to the edge of the pixel electrode 191. That is, problems of degraded display quality which might occur when the liquid crystal molecules 302 are aligned in the direction parallel to the polarization axes in the edges of the pixel electrode 191, that is, the third region Z (refer to FIGS. 5 and 6), may be avoided.

The dot-shaped peripheral bundle electrodes 193-1 may improve liquid crystal controllability of the LCD so as to improve transmittance, and the area of the pixel electrode 191 may be partially reduced to improve response speed.

Although certain exemplary embodiments and implementations have been described herein, other exemplary embodiments and modifications will be apparent from this description. Accordingly, the invention is not limited to such exemplary embodiments, but rather to the broader scope of the presented claims and various obvious modifications and equivalent arrangements.

What is claimed is:

1. A liquid crystal display comprising:
    a first substrate;
    a first electrode which is disposed on the first substrate, and which includes a stem part dividing a pixel into a plurality of domains, a plurality of micro branch parts extending in one direction from at least one stem of the stem part, and a peripheral bundle electrode connected to an end of at least one of the plurality of micro branch parts and disposed along an edge of the pixel;
    a first panel including protrusions arranged along an outer circumference of the peripheral bundle electrode and projected in the direction vertical to the first substrate;
    a second substrate opposite to the first substrate;
    a second panel including a second electrode which is disposed on the second substrate and which faces the first electrode; and
    a liquid crystal layer which is interposed between the first panel and the second panel and which includes liquid crystals.

2. The liquid crystal display of claim 1, wherein the first panel further includes:
    a first slit pattern which has one end contacting the stem part and the other end contacting the peripheral bundle electrode; and
    a second slit pattern which spaces a part of branched finger electrodes of the plurality of micro branch parts, and has one end disposed along a lengthwise direction of the branched finger electrodes and contacting the stem part and the other end contacting the protrusions,
    wherein the first and second slit patterns remove branched finger electrodes neighboring the branched finger electrodes of the plurality of micro branch parts so as to space the branched finger electrodes apart from each other, and at least one of the first slit pattern and the second slit pattern is disposed on the first panel.

3. The liquid crystal display of claim 2, wherein the first slit pattern and the second slit pattern are spaced apart from each other in a stepping-stone manner in the first panel.

4. The liquid crystal display of claim 2, wherein the branched finger electrodes and the slit patterns are disposed alternately to one another in adjacent domains of the plurality of domains.

5. The liquid crystal display of claim 2, wherein the branched finger electrodes and the slit pattern have pitches ranging from about 4 micrometers to about 8 micrometers.

6. The liquid crystal display of claim 1, comprising a first polarization plate having a polarization axis in one direction, the first polarization plate being disposed on the first panel; and
    a second polarization plate having a polarization axis orthogonal to the one direction, the second polarization plate being disposed on the second panel,
    wherein the plurality of micro branch parts extend in a direction ranging from about 30 degrees to about 60 degrees with respect to the polarization axes of the first and second polarization plates.

7. The liquid crystal display of claim 1, wherein the first electrode further includes:
    the peripheral bundle electrode which contacts the protrusions and which is disposed in a direction parallel to the protrusions;
    the stem part including horizontal and vertical stem parts which are connected to the peripheral bundle electrode and which divide the pixel into the plurality of domains; and
    the plurality of micro branch parts extended to the horizontal and vertical stem parts and connected to the peripheral bundle electrode,
    wherein the peripheral bundle electrode, the stem part and the plurality of micro branch parts are integrally provided.

8. The liquid crystal display of claim 7, wherein widths of the horizontal and vertical stem parts range from about 2 micrometers to about 5 micrometers.

9. The liquid crystal display of claim 1, wherein heights of the protrusions range from about 0.5 micrometers to about 2 micrometers.

10. The liquid crystal display of claim 1, wherein widths of the peripheral bundle electrode range from about 2 micrometers to about 4 micrometers.

11. The liquid crystal display of claim 1, wherein widths of the protrusions range from about 3 micrometers to about 5 micrometers.

12. The liquid crystal display of claim 1, wherein the first electrode disposed in the pixel further includes:
   a first region in which a micro branch part of the plurality of micro branch parts adjacent to the stem part is disposed; and
   a second region which is spaced apart from the stem part, and in which at least one peripheral bundle electrode and protrusion are disposed at an end of one of the plurality of micro branch parts,
   wherein the at least one peripheral bundle electrode and protrusion disposed in the second region provide a vector to liquid crystal molecules in the second region so as to rotate the liquid crystal molecules in a direction similar to an average liquid crystal azimuthal angle of the liquid crystal molecules in the first region.

13. The liquid crystal display of claim 12, wherein an extending direction of branched finger electrodes and the average liquid crystal azimuthal angle of the liquid crystal molecules are in the same direction.

14. The liquid crystal display of claim 1, wherein the first electrode further includes a plurality of sub-electrodes disposed in one pixel, and a connection electrode interconnecting sub-electrodes of the plurality of sub-electrodes adjacent to each other.

15. The liquid crystal display of claim 14, wherein the connection electrode is disposed in a gap part defined between sub-electrodes of the plurality of sub-electrodes neighboring each other.

16. The liquid crystal display of claim 15, wherein the protrusions are disposed in the gap part.

17. The liquid crystal display of claim 14, wherein the connection electrode is disposed below the protrusions.

18. The liquid crystal display of claim 15, wherein the protrusions are disposed at ends of the horizontal and vertical stem parts and in a corner region of the pixel.

19. The liquid crystal display of claim 1, wherein the protrusions are disposed in an edge region of the pixel excluding a corner region of the pixel.

20. The liquid crystal display of claim 1, wherein the gap part includes horizontal and vertical gap parts which space the sub-electrodes apart from each other, and a rim gap part disposed in an edge of the pixel,
   wherein widths of the protrusions disposed in the horizontal and vertical gap parts and widths of the protrusions disposed in the rim gap part are different from each other.

* * * * *